United States Patent
Bims

(10) Patent No.: US 8,995,996 B2
(45) Date of Patent: Mar. 31, 2015

(54) METHODS AND APPARATUS FOR PERFORMANCE OPTIMIZATION OF HETEROGENEOUS WIRELESS SYSTEM COMMUNITIES

(76) Inventor: Harry V. Bims, Menlo Park, CA (US)

( * ) Notice: Subject to any disclaimer, the term of this patent is extended or adjusted under 35 U.S.C. 154(b) by 836 days.

(21) Appl. No.: 12/540,314

(22) Filed: Aug. 12, 2009

(65) Prior Publication Data

US 2011/0039554 A1    Feb. 17, 2011

(51) Int. Cl.
| | | |
|---|---|---|
| *H04W 4/00* | (2009.01) | |
| *H04L 1/00* | (2006.01) | |
| *H04W 72/00* | (2009.01) | |
| *H04W 24/00* | (2009.01) | |
| *H04B 7/212* | (2006.01) | |
| *H04B 1/00* | (2006.01) | |
| *H04L 27/28* | (2006.01) | |
| *H04W 8/24* | (2009.01) | |
| *H04W 28/04* | (2009.01) | |
| *H04W 92/18* | (2009.01) | |

(52) U.S. Cl.
CPC ............. *H04L 1/0033* (2013.01); *H04L 1/0003* (2013.01); *H04L 1/0009* (2013.01); *H04W 8/24* (2013.01); *H04W 28/04* (2013.01); *H04W 92/18* (2013.01)
USPC ........ 455/434; 455/450; 455/456.2; 455/423; 455/452.2; 370/329; 370/347; 375/150; 375/260

(58) Field of Classification Search
USPC .................................................. 455/434, 450
See application file for complete search history.

(56) References Cited

U.S. PATENT DOCUMENTS

| | | |
|---|---|---|
| 5,237,587 A | 8/1993 | Schoolcraft |
| 5,774,876 A | 6/1998 | Woolley et al. |
| 6,249,680 B1 | 6/2001 | Wax et al. |
| 2002/0141375 A1* | 10/2002 | Choi .............................. 370/347 |
| 2004/0166870 A1* | 8/2004 | Backes ....................... 455/452.2 |
| 2005/0075104 A1* | 4/2005 | Jain et al. ...................... 455/423 |
| 2007/0099567 A1* | 5/2007 | Chen et al. ................... 455/41.2 |
| 2007/0224936 A1* | 9/2007 | Desai ........................... 455/41.2 |
| 2008/0177751 A1* | 7/2008 | Tan ................................. 707/10 |
| 2008/0254810 A1* | 10/2008 | Fok et al. ................... 455/456.2 |
| 2009/0054002 A1* | 2/2009 | Urushihara et al. ........ 455/67.13 |
| 2009/0147867 A1* | 6/2009 | Okamoto et al. ............. 375/260 |
| 2009/0176454 A1 | 7/2009 | Chen |
| 2009/0196173 A1* | 8/2009 | Wang et al. ................... 370/230 |
| 2009/0257379 A1 | 10/2009 | Robinson et al. |
| 2010/0085903 A1* | 4/2010 | Pandey et al. ................ 370/311 |

* cited by examiner

*Primary Examiner* — Timothy Pham
(74) *Attorney, Agent, or Firm* — Womble Carlyle Sandridge & Rice, LLP

(57) ABSTRACT

Methods and apparatus for enhancing the operation and capacity of a wireless coexistence community having devices with multiple differing air interfaces that share physical or spectral access resources such as time, frequency, code, etc. These methods and apparatus allow the multiple devices to manage interference among one another fairly or according to one or more policy objectives, despite having different physical layer operations and implementations. In one embodiment, a mathematics-based model is utilized in accordance with device profiles to intelligently optimize the operation of one or more of the wireless devices according to a "good neighbor" paradigm.

17 Claims, 18 Drawing Sheets

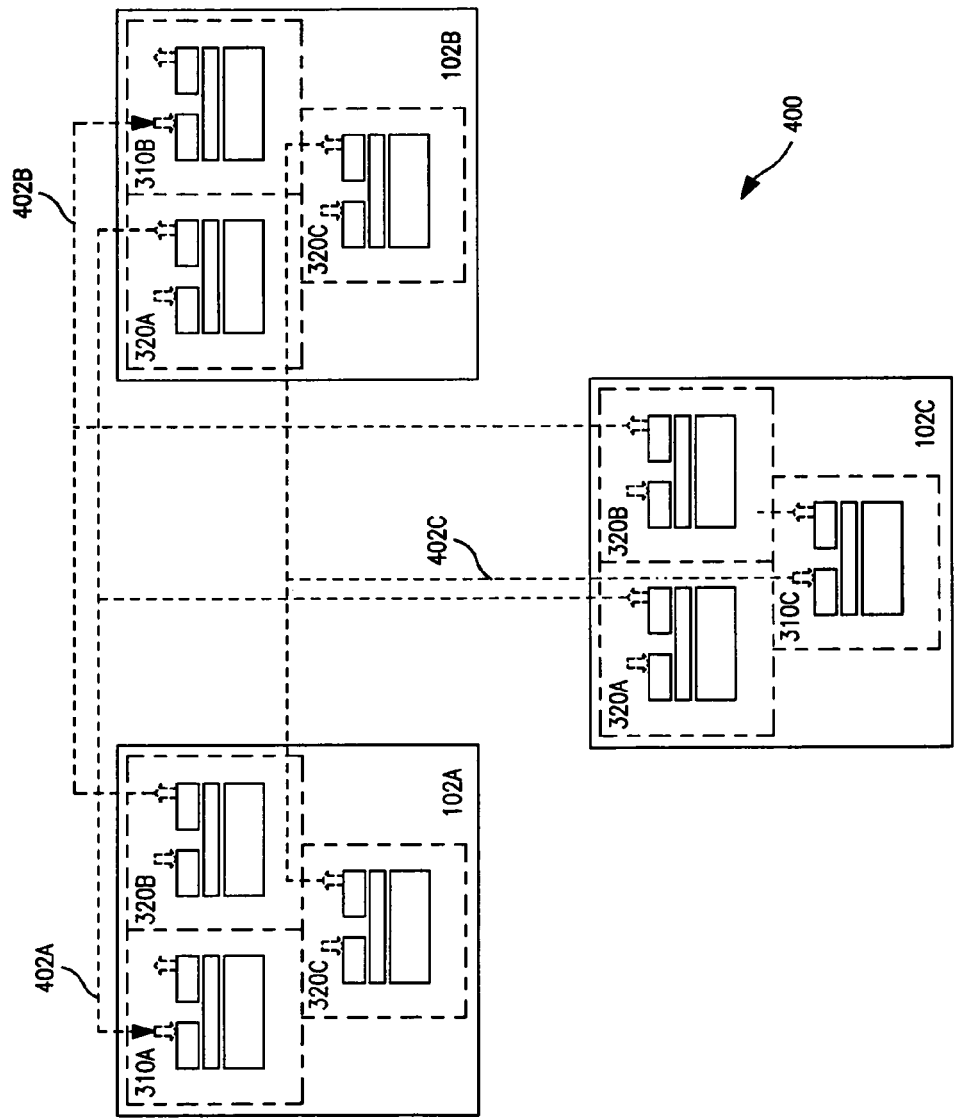

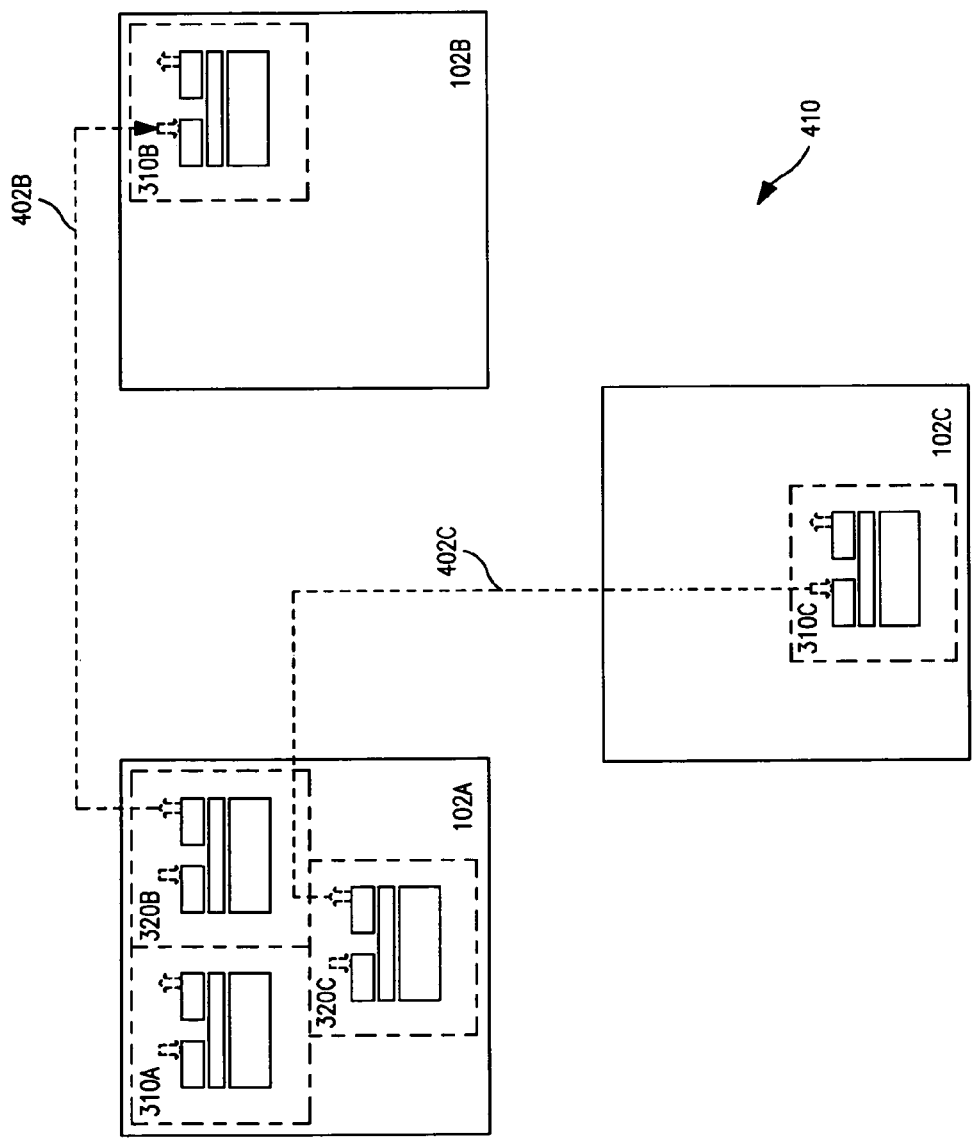

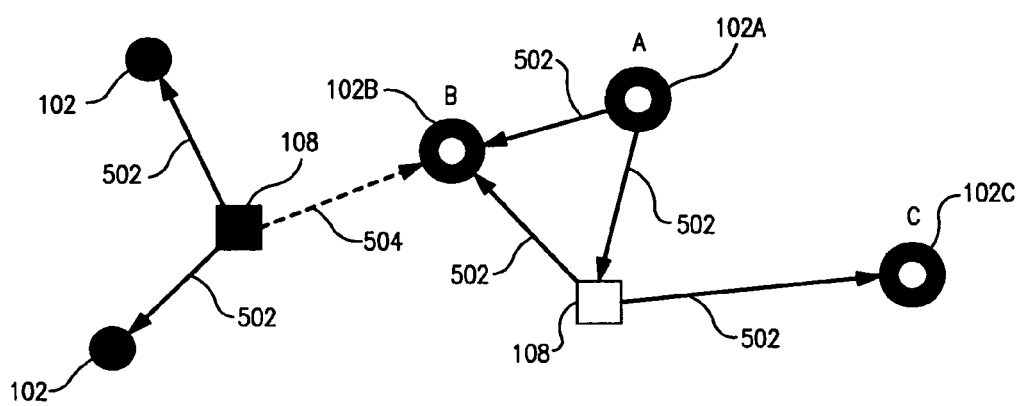
FIG. 5

Honeycomb arrangement

| Type | Name | Length in bytes | Value | |
|---|---|---|---|---|
| 1 | Number of interferers | 1 | | ⎫ |
| 2 | Type of interferer | 1 | up to 256 different interference sources identified. Can be different wireless systems, or RF sources | ⎬ 702 |
| 3 | RSSI report of interferer | 1 | Mean and standard deviation of RSSI | ⎭ |
| 4 | Address of interferer | 6 | The IP address of the interfering device | ⎫ |
| 5 | Location of the sending device | 15 | The location of the sending device using 40 bits for latitude, and 40 bits for longitude, and 40 bits for altitude | |
| 6 | wireless protocol standard | 1 | identifies which wireless protocol standard is the primary language of this device | ⎬ 704 |
| 7 | EIRP of sending device | 1 | | ⎭ |
| 8 | Channel occupancy sensitivity (optional) | varies | sensitivity curve | ⎫ |
| 9 | latency sensitivity (opional) | varies | sensitivity curve | |
| 10 | jitter sensitivity (optional) | varies | sensitivity curve | ⎬ 706 |
| 11 | throughput sensitivity (optional) | varies | sensitivity curve | |
| 12 | etc. | | | ⎭ |

↙ 700

FIG. 7

System A sensitivity curve parameters (video)

| Type | Name | Length in bytes | Value |
|---|---|---|---|
| 8 | Channel occupancy sensitivity (optional) | 1 | 6 |
| 9 | latency sensitivity (optional) | 1 | 3 |
| 11 | throughput sensitivity (optional) | 1 | 8 |

FIG. 7A — 706A

System B sensitivity curve parameters (file transfer)

| Type | Name | Length in bytes | Value |
|---|---|---|---|
| 8 | Channel occupancy sensitivity (optional) | 1 | 8 |
| 9 | latency sensitivity (optional) | 1 | 2 |
| 11 | throughput sensitivity (optional) | 1 | 2 |

FIG. 7B — 706B

System C sensitivity curve parameters (phone call)

| Type | Name | Length in bytes | Value |
|---|---|---|---|
| 8 | Channel occupancy sensitivity (optional) | 1 | 3 |
| 9 | latency sensitivity (optional) | 1 | 9 |
| 11 | throughput sensitivity (optional) | 1 | 4 |

FIG. 7C — 706C

METHODS AND APPARATUS FOR PERFORMANCE OPTIMIZATION OF HETEROGENEOUS WIRELESS SYSTEM COMMUNITIES

RELATED APPLICATIONS

This application is related to co-owned and co-pending U.S. patent application Ser. No. 12/082,586 filed Apr. 11, 2008 and entitled "Methods and Apparatus for Network Capacity Enhancement for Wireless Device Coexistence", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to compensating for or mitigating the effects of electro-magnetic signal interference between devices or components implementing wireless air interfaces.

2. Description of Related Technology

As wireless spectrum continues to become increasingly more crowded, neighboring wireless systems are increasingly faced with the challenge of sharing that scarce spectrum with incompatible neighboring systems. This incompatibility occurs because the wireless protocol standards that govern the interaction of devices within a wireless system are different. These wireless protocol standards generally have at least two main components or layers, a physical or PHY layer, and a medium access control or MAC layer. Incompatibilities between wireless systems can exist in either or both of these layers.

For example, in the United States, wireless systems based on the Bluetooth protocol standard occupy the 2.4 GHz to 2.4835 GHz band, which is the same frequency band used by microwave ovens, some cordless phones, and garage door openers. The Bluetooth devices share this spectrum by utilizing a physical layer technology called frequency hopping spread spectrum (FHSS), to avoid interference from these devices. However, IEEE 802.11b-based and IEEE 802.11g-based wireless systems also occupy the 2.4 GHz to 2.4835 GHz band. These systems utilize physical layer technologies such as Complementary Code Keying (CCK) and/or Direct Sequence Spread Spectrum (DSSS), which can interfere with the FHSS used by Bluetooth. Coexistence between Bluetooth systems and these IEEE 802.11 systems requires additional mechanisms and recommended practices that are being developed by the IEEE 802.15 working group.

In addition to the challenge of sharing spectrum between Bluetooth and IEEE 802.11 systems, the FCC recently awarded the 3.65 GHz spectrum band to both IEEE 802.11y, and IEEE 802.16h systems, with a requirement that the systems coexist in a manner that minimizes interference to their neighboring wireless systems. Similarly the FCC has opened the 700 MHz TV Whitespace spectrum band for coexistence between wireless networks and regulatory incumbents (sometimes called primary and secondary users). Ideally, new wireless networks should minimize their interference with incumbent users. For example, new wireless devices that seek to reuse TV whitespace spectrum, should peacefully coexist with legacy devices (such as wireless microphones).

The FCC identifies two mechanisms for minimizing interference in coexisting wireless systems. The first solution proposes that operators "make any effort" to minimize interference by registering their base station locations, and coordinating their operations to minimize interference. Alternatively, or in combination, a second solution is additionally suggested which allows the use of unrestricted contention protocols that "are broadly compatible and function to prevent interference even with other dissimilar contention technologies on the market". Over time, the combination of heavily reused wireless spectrums, and the widespread, disorganized usage of dissimilar systems suggests that the proximity of differing wireless technologies will continue to shrink, causing an increase in undesirable interference to neighboring systems.

The effective implementation of convergence products has led to a revolution in the way consumers view computerized devices. These next generation computerized devices focus on offering consumers a substantially unified solution for a variety of services to which consumers have become accustomed. Examples of such converged solutions include the exemplary "MacBook Air" laptop computer, and iPhone™ each manufactured by the Assignee hereof, which support a variety of wireless protocols and other functions. For instance, the iPhone has the capability of, among other things, sending and receiving emails over a wireless LAN (WLAN) network, making and receiving calls using a GSM or 3G cellular network, and operating wireless peripheral equipment (such as wireless headsets) using the Bluetooth (BT) protocol.

When it comes to coexistence between wireless systems sharing the same frequency band, the impact of any system on its neighbors will depend on both the protocol design and implementation of the system in question, and the protocol design and implementation of the neighboring systems. Furthermore, measuring the performance of the coexistence community using a single metric (e.g. such as channel occupancy) is often ineffective because different systems use different PHY and MAC technologies. For example one system may be more sensitive to the decrease in channel occupancy required to support coexistence than a coexisting but different system. This can apply to other metrics as well, such as latency, throughput, bandwidth allocation, etc. The wireless protocol standards of the neighboring systems may adversely affect each other in various ways and in varying amounts that can be interrelated.

Some systems are designed to accommodate environments with interfering systems. For example, in an Orthogonal Frequency Division Multiple Access (OFDMA) system, certain frequency tones may be disabled when the system experiences high levels of interference on those frequency tones. This selective tone usage may enable a transmitter and receiver to determine which frequency tones to disable, thus allowing the OFDMA system to share the same frequency band with a neighboring system. An analogous modification could be performed in the time domain. In both of these cases, the total current throughput for the OFDMA system may be held constant by moving the system traffic to non-interfering physical resources, whether frequency tone-based, or time-based. Thus, OFDMA carefully manages how much of a physical resource is being occupied by a system, as well as the specific resources it occupies, and when those resources are occupied, in relation to all neighboring systems (including other systems that do not use OFDMA as a spectral access technique).

Not all systems have the flexibility of OFDMA technologies. Every wireless system is designed with different protocols at both the physical (PHY) and medium access control (MAC) layers to address the needs of a particular set of application requirements. For example, OFDMA-based systems such as IEEE 802.16 are relatively more concerned with data throughput in their design and architecture than systems based on the IEEE 802.15.4 Low Rate Wireless Personal Area Network standard (referenced subsequently herein), which generally are more concerned with data reliability (which lowers power consumption and reduces latency).

In addition, the traditional measures of link quality—received signal strength indication (RSSI), header error check (HEC) failure rate, cyclic redundancy check (CRC) failure rate, bit error rate (BER), and packet error rate (PER), etc.—do not consider the impacts of neighboring systems. Hence, when interference is present from neighboring systems, traditional link quality measurements may produce misleading results that cause the device to incorrectly respond. For example, the devices within a coexistence community of interfering networks may decide to boost their power as a result of increased BER. If the devices were operating in isolation, boosting transmit power would reduce the BER. However, when performed in a coexistence community, the increased transmit power of each member further exacerbates the interference of the community.

In another example, the devices within a coexistence community may adjust their modulation and coding scheme (MCS) to compensate for high BER. If the devices were operating in isolation, reducing the data rate and increasing channel occupancy would improve the BER. However, in a coexistence community, each device which increases its channel occupancy worsens the overall channel capacity. Traditional approaches do not work well when used in coexistence communities. Thus new approaches are needed for coexistence communities which re-interpret the meaning of link quality, both in isolation, and in relation to other devices.

Traditional approaches fail to produce a globally optimal solution that balances the differing objectives of coexisting wireless systems across a wide variety of performance metrics, where each wireless system may differ according to wireless protocol standard and mix of application usage, and therefore, differ by sensitivity to each performance metric. Accordingly, improved methods and apparatus are needed for enhancing the local performance of neighboring wireless systems against their local objectives, within the context of balancing the competition for access to resources (e.g. frequency bands, time slots, spreading codes, etc.) inherent in coexistence between wireless systems.

Ideally, such improved methods and apparatus would promote the existence of a "good neighborhood" by understanding the behavior of wireless modules within a given converged device, as well as the behavior of other devices in the neighborhood, and adjusting operating behaviors (whether dynamically or statically) in order to benefit the neighborhood as a whole. Such a holistic approach would not only benefit the converged device implementing the policies, but also the broader coexistence community in general.

Such improved methods and apparatus would also ultimately provide the users of the coexistence community with the best user experience possible, while offering converged services in a space and power-efficient manner.

SUMMARY OF THE INVENTION

The present invention satisfies the foregoing needs by providing, inter alia, methods and apparatus for compensating for and/or mitigating the effects of electromagnetic signal and other types of interference between devices or components implementing two or more wireless air interfaces or protocols.

In a first aspect of the invention, a method of optimizing the operation of a first wireless device is disclosed. In one embodiment, the first device operates in an environment where interference with, or competition for resources occurs between, one or more other wireless devices operating occurs, and the method comprises: transmitting profile data between at least one of the other wireless devices and the first wireless device; and utilizing the profile data to optimize the operation of at least the first wireless device relative to the at least one other wireless device.

In one variant, the first wireless device comprises a plurality of air interfaces, and the at least one other device comprises at least one air interface in common with the first wireless device.

In another variant, the utilizing the profile data comprises performing a linear programming optimization based at least in part on the profile data.

In another variant, the utilizing the profile data comprises performing pseudo-randomized optimizations based at least in part on the profile data. Such pseudo-random operations may include random graph topologies, stochastic geometry and percolation theory based computations.

In still another variant, the profile data utilized in the optimization comprises profile data from both the first wireless device and the at least one other device.

In yet another variant, the act of transmitting comprises transmitting using a protocol that is agnostic to each of the plurality of air interfaces of the first device and the at least one air interface of the at least one other device.

In another variant, the interference with, or competition for resources between, the first device and the at least one other device comprises contention for a common portion of the electromagnetic spectrum.

In a further variant, the optimization comprises optimization according to a fairness equation. The fairness equation substantially assures that neither of the first device or the at least one other device are frustrated from accessing the resources.

In yet another variant, the profile data comprises: (i) first data indicating one or more capabilities of a wireless device with which the profile is associated; and (ii) one or more optimization factors or priorities for the wireless device with which the profile is associated.

In a second aspect of the invention, a method of allocating resources between a plurality of wireless devices is disclosed. In one embodiment, the plurality of wireless devices operates within proximity to one another, and the method comprises: transmitting profile data between at least two of the plurality of wireless devices using a common air interface; and utilizing the profile data to allocate resources between the at least two wireless devices according to at least one operational goal or objective.

In one variant, the allocation of resources between the devices comprises adjusting at least one operational parameter associated with an air interface of at least one of the devices, the air interface being different than the common air interface; and the transmitting comprises transmitting using an interface-agnostic communication protocol.

In another variant, the interface-agnostic communication protocol comprises a lightweight protocol adapted to carry only limited amounts of data at low bandwidth.

In yet another variant, the act of utilizing is performed iteratively or periodically.

In still another variant, the act of utilizing is performed in response to initiation of an application layer program running on at least one of the devices.

In a third aspect of the invention, a method for enforcing at least one coexistence policy between two or more wireless devices is disclosed. In one embodiment, the first of the two or more devices comprises at least a first operational protocol and at least a first physical resource, and one or more neighboring wireless devices comprises one or more other operational protocols and one or more other physical resources, and the method comprises: determining that at least a first portion of the first physical resource is experiencing interference from one or more of the neighboring wireless devices; determining that the first operational protocol and the other operational protocols differ; identifying a first performance profile corresponding to the one or more neighboring wireless systems, the first performance profile defining one or more desired channel characteristics; and adjusting the operation of the first physical resource based at least in part on the first performance profile so as to support the at least one coexistence policy.

In one variant, the method further comprises: transmitting a second performance profile corresponding to the first wireless device, the second performance profile defining one or more desired channel characteristics; and based at least in part on the second performance profile, the one or more neighboring wireless devices adjusting the operation of the other physical resources.

In another variant, the at least one coexistence policy comprises operation according to a fairness equation, the fairness equation substantially assuring that none of the wireless devices are prevented from at least partly achieving their respective desired channel characteristics.

In another variant, adjusting the operation of the first physical resource comprises use of a linear programming algorithm.

In still another variant, adjusting the operation of the first physical resource comprises the use of pseudo-randomized optimizations.

In yet another variant, the pseudo-random operations may include random graphs, stochastic geometry and percolation theory based computations.

In another variant, the coexistence policy comprises a policy enforcing electrical power conservation within at least one of the two or more devices.

In still another variant, the coexistence policy comprises a policy enforcing minimum quality-of-service (QoS) within at least one of the two or more devices.

In a fourth aspect of the invention, an apparatus capable of operational coexistence with one or more neighboring wireless systems is disclosed. In one embodiment, the apparatus comprises at least a first operational protocol, and the one or more neighboring wireless systems comprising one or more other operational protocols. The apparatus comprises: a first radio transceiver operating under the first operational protocol and transmitting and receiving on a first physical resource; a second radio transceiver operating under at least one of the other operational protocols and receiving on a second physical resource; wherein at least a first portion of the first physical resource and a second portion of the second physical resource overlap; and a processing unit and a computer readable apparatus coupled to the processing unit. The computer readable apparatus comprises a computer program having a plurality of instructions which when executed by the processing unit, implement a global allocation policy within at least the apparatus.

In one variant, the computer program implements the global allocation policy by at least: operating the second radio transceiver to detect the presence of the one or more neighboring wireless systems; identifying a first performance profile corresponding to at least one or more neighboring wireless systems, the first performance profile defining at least one desired wireless channel characteristic; and operating the first physical resource based at least in part on the first performance profile.

In another variant, the second radio transceiver transmits on the second physical resource.

In still another variant, the plurality of instructions further comprises instructions which when executed by the processing unit: transmits a second performance profile corresponding to the first radio transceiver using the second radio transceiver, the second performance profile defining at least one desired channel characteristic and being useful to at least one of the one or more neighboring wireless systems in sharing of the first or second physical resources.

In yet another variant, the global allocation policy within at least the apparatus comprises performing one or more of linear programming, random graphs, stochastic geometry or percolation theory based computations.

In still yet another variant, the apparatus comprises a mobile telephony device having a cellular air interface, and at least one other wireless interface comprising one of the first and second radio transceivers.

In another variant, the first and second radio transceivers comprise Wi-Fi-compliant and Bluetooth-compliant transceivers, respectively.

In a fifth aspect of the invention, a computer-readable apparatus useful for implementing global optimization policies is disclosed. In one embodiment, the apparatus comprises a computer-readable medium such as a hard disk drive (HDD) or program memory containing a computer program having a plurality of instructions that, when executed, implement global optimization according to one or more algorithms and device profiles.

In a sixth aspect of the invention, an apparatus acting as a proxy for another device in terms of global optimization is disclosed. In one embodiment, the proxy apparatus comprises a Wi-Fi access point (AP), and the other device comprises a Wi-Fi station (STA) or UE.

In a seventh aspect of the invention, methods of doing business relating to the aforementioned operation and optimization methods and apparatus are disclosed.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 4A is a block diagram illustrates one embodiment of a system having a coexistence community communicating using a multilingual capability for communicating parameters related to performance optimization.

FIG. 4B is a block diagram illustrates one embodiment of a system having a coexistence community communicating using a master transceiver having multilingual capability for communicating parameters related to performance optimization.

FIG. 5 is a random graph representing a typical wireless coexistence community, comprising two systems having different air interfaces.

FIG. 7 is a graphical representation of one embodiment of a performance profile message format in accordance with the principles of the present invention.

FIG. 7A is an abbreviated portion of a graphical representation of one embodiment of a sensitivity curve adapted to facilitate video transfer in accordance with the principles of the present invention.

FIG. 7B is an abbreviated portion of a graphical representation of one embodiment of a sensitivity curve adapted to facilitate file transfer in accordance with the principles of the present invention.

FIG. 7C is an abbreviated portion of a graphical representation of one embodiment of a sensitivity curve adapted to facilitate a phone call in accordance with the principles of the present invention.

DETAILED DESCRIPTION OF THE INVENTION

Figure 1:
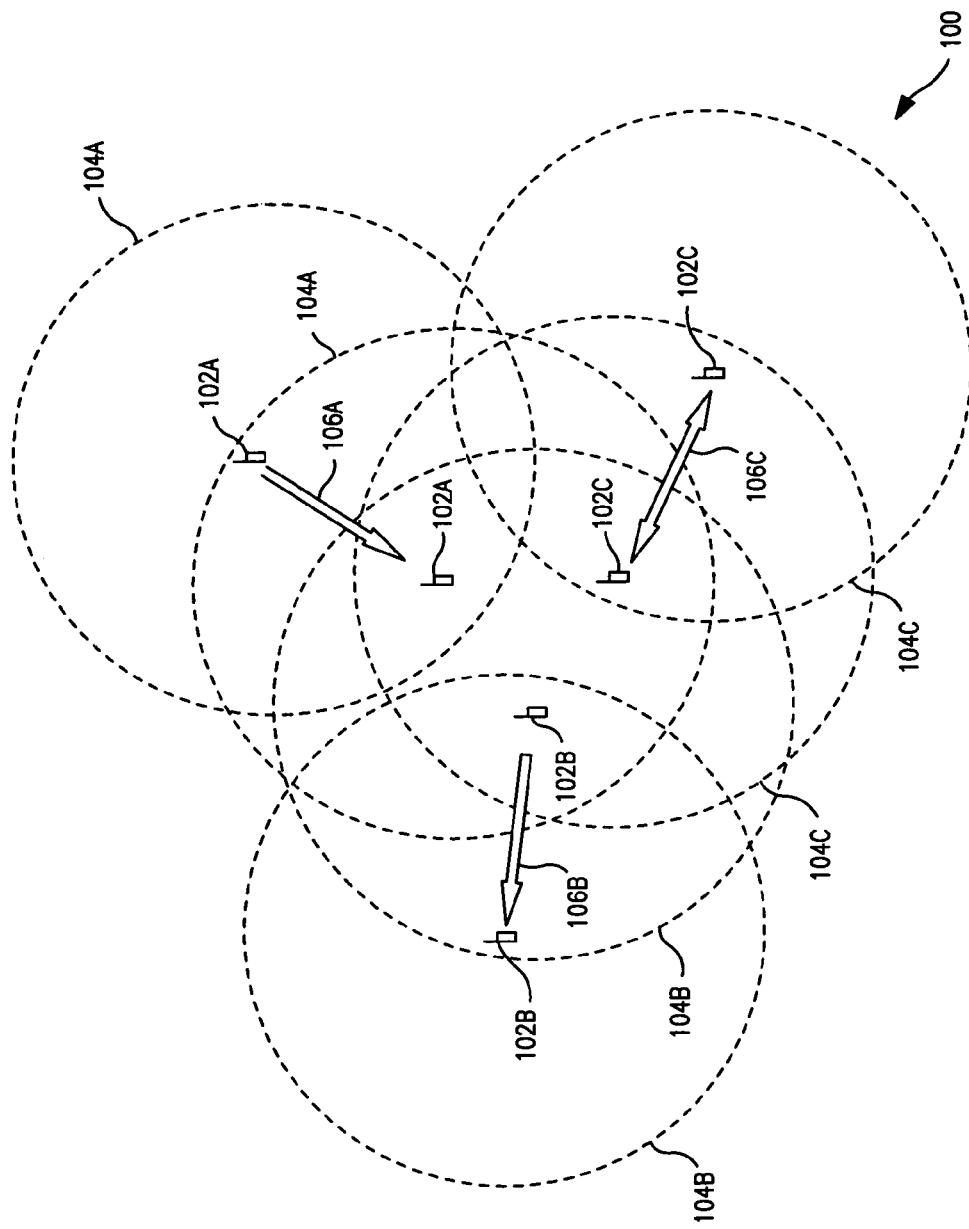
FIG. 1 is a graphical illustration of a typical wireless coexistence community having multiple mobile units.

Reference is now made to the drawings, wherein like numerals refer to like parts throughout.

As used herein, the term "IEEE Std. 802.15.4" and similar forms refers without limitation to IEEE Std. 802.15.4-2003 entitled "IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless—Personal Area Networks (LR-WPANs)" dated Oct. 1, 2003; IEEE Std. 802.15.4-2006 entitled "IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless—Personal Area Networks (WPANs)" dated Sep. 8, 2006; and IEEE Std. 802.15.4a-2007 entitled "IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless—Personal Area Networks (WPANs)—Amendment 1—Add Alternate PHYs" dated Aug. 31, 2007, each of the foregoing incorporated herein by reference in its entirety, and subsequent revisions thereto.

As used herein, the term "Bluetooth" refers without limitation to any device, software, interface or technique that complies with one or more of the Bluetooth technical standards, including Bluetooth Core Specification Version 1.0, 1.1 (ratified as IEEE Standard 802.15.1-2002), Version 1.2 (ratified as IEEE Standard 802.15.1-2005) entitled "Specification Volume 0—Master Table of Contents & Compliance Requirements—Covered Core Package version: 1.2" dated Nov. 5, 2003" (and any incorporated volumes), Version 2.0 entitled "Specification Volume 0—Master Table of Contents & Compliance Requirements—Covered Core Package version: 2.0+EDR" dated Nov. 4, 2004" (and any incorporated volumes), and Version 2.1+EDR entitled "Specification Volume 0—Master Table of Contents & Compliance Requirements—Covered Core Package version: 2.0+EDR" dated Jul. 26, 2007 (and any incorporated Volumes), each of the foregoing being incorporated herein by reference in its entirety, and any subsequent versions thereof.

As used herein, the terms "client device" and "end user device" include, but are not limited to, personal computers (PCs), such as for example an iMac™, Mac Pro™, Mac Mini™, MacBook™ or MacBook™ Air, and minicomputers, whether desktop, laptop, or otherwise, as well as mobile devices such as handheld computers, such as for example an iPhone™, PDAs, video cameras, set-top boxes, personal media devices (PMDs), or any combinations of the foregoing.

As used herein, the term "co-located" refers to two or more devices or components which are sufficiently physically proximate to one another so as to cause, for example, at least some level of interference with the operation of at least one of the devices/components.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). Ics may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, 802.20, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., Tvnet™), radio frequency tuner (e.g., in-band or OOB, cable modem, etc.), Wi-Fi (802.11a/b/e/g/n/y), WiMAX (802.16), PAN (802.15), or IrDA families.

As used herein, the term "USB" refers to a serial bus standard to interface devices to a host computer or other device and includes without limitation USB 2.0 entitled "Universal Serial Bus Specification—Revision 2.0" dated Apr. 27, 2000, USB 3.0 entitled "Universal Serial Bus Specification 3.0—Revision 1.0" dated Nov. 12, 2008, and wireless USB including so-called "Wireless USB 1.0" entitled "Wireless Universal Serial Bus Specification—Revision 1.0" dated May 12, 2005, each of the foregoing being incorporated herein by reference in its entirety, and any subsequent versions thereof.

As used herein, the term "Wi-Fi" refers to, without limitation, any of the variants of ANSI/IEEE-Std. 802.11 ("Information technology—Telecommunications and information exchange between systems—Local and metropolitan area networks—Specific requirements—Part 11: Wireless LAN Medium Access Control (MAC) and Physical Layer (PHY) Specifications") or related standards including 802.11a/b/e/g/n/y, each of the foregoing being incorporated herein by reference in its entirety.

As used herein, the term "wireless" means any wireless signal, data, communication, or other interface including without limitation Wi-Fi™, Bluetooth™, 3G, HSDPA/HSUPA, TDMA, CDMA (e.g., IS-95A, WCDMA, etc.), FHSS, DSSS, GSM, PAN/802.15, WiMAX (802.16), MWBA (802.20), narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for enhancing the operation and capacity of a coexistence community having associated devices with multiple differing air interfaces that share physical or spectral access resources (e.g. time, frequency, code, etc.). These methods and apparatus allow, among other things, the multiple devices to manage interference among one another, despite having different physical, and protocol operations and implementations.

Apparatus and methods are also disclosed for creating a "high level" or universal definition of application layer requirements, wherein such definition is not based on device implementation specifics. Advantageously, such abstract definitions can be standardized and communicated among the different wireless protocols so as to be useful to each device. A population of such apparatus thus enabled may also dynamically modify their behavior to ensure that shared physical resources are allotted to each apparatus fairly.

In one regard, the invention also advantageously enables a broader range of cooperative policies between co-existing devices without regard to wireless system specifics.

In one aspect of the invention, neighboring systems in a coexistence community can communicate via the exchange of performance profile information. In one embodiment, the profile information may comprise elements such as: location information, identification of interferers, and interference information. In one variant, the profile information may additionally comprise one or more optimization metrics. Such optimization metrics identify the relative weights that each system individually ascribes to a one or more performance metrics. This communication of performance profile information can take place over a common control wireless system, and/or a "multi-lingual" interface.

A limited multi-lingual transceiver apparatus adapted to communicate network optimization parameters in a plurality of different wireless systems is also disclosed. In one embodiment, the multi-lingual transceivers are connected to subsystems which are adapted for monitoring a coexistence community, optimization of the coexistence community, and a signaling subsystem for negotiating network optimization parameters. In one variant, the multi-lingual transceiver apparatus comprises one or more non-native transceivers enabling such coexistence community communication. The non-native transceivers may additionally be limited in functionality to minimize the cost of implementation.

Further, methods are disclosed which comprise a calculation of optimal behavior within a coexistence community environment, including applying operations research techniques to the distributed management of a coexistence community. Algorithms are distributed (or pre-stored) throughout each of the neighboring wireless systems, and adapted for use with a collection of profiles corresponding to at least a subset of the coexistence community. The collection of profiles designates a listing of performance metrics and their relative desired weighting for each of the subset of the coexistence community.

In one embodiment, the algorithms are of a linear programming nature, to facilitate implementation in either hardware or software apparatus.

Another aspect of the invention is its ability to dynamically change the optimal point of the "global fairness goal" for the community, based on inter alia the dynamically changing needs of applications supported on the wireless devices and systems within the community.

DETAILED DESCRIPTION OF EXEMPLARY EMBODIMENTS

Exemplary embodiments of the present invention are now described in detail. While these embodiments are primarily discussed in the context of a wireless coexistence scheme implemented using certain prescribed protocols, it will be recognized by those of ordinary skill that the present invention is not limited to any particular wireless protocol(s) or spectral access techniques. In fact, the principles discussed herein are equally applicable to any number of wireless protocols which at least partly share frequency spectrum, and with which antenna isolation or spectrum bandwidth problems occur as a result of the two wireless protocol implementations being substantially co-located with one another. For example, the Apple TV™ digital media receiver sold and marketed by the Assignee hereof, utilizes both WLAN IEEE 802.11 and wireless universal serial bus (USB) air interfaces. The WLAN and wireless USB interfaces share the same spectrum (i.e., ISM band), and hence could also benefit from the coexistence solutions discussed subsequently herein. In another such example, coexistence between cellular systems, such as LTE and CDMA may overlap and or mutually interfere at cellular station boundaries. Myriad other combinations of different air interfaces utilizing at least a portion of the same spectrum will also be recognized by the ordinary artisan given this disclosure.

Moreover, while discussed primarily in the context of a basic two protocol and three-protocol topologies, it is recognized that other topologies (e.g., four-protocol, etc.) may be used consistent with the invention. Feasibly, any number of wireless protocols could benefit from the coexistence solutions discussed subsequently herein. Such a system might integrate e.g., WLAN for wireless networking, BT for personal area devices, FTP, or networking (PAN), and wireless USB (for remote controller, HID mouse and keyboard), etc., all within close proximity.

Also, it will be noted that while the methods and apparatus described herein are primarily cast in terms of two or more discrete host devices (e.g., a Wi-Fi enabled Smartphone and another 2.4 GHz band air interface, etc.), the invention is in no way limited to such applications, and in fact may be utilized in an intra-device fashion, such as to allow cooperation between two or more potentially interfering air interfaces within the same device.

Network Topology—

The traditional topology model of a wireless cellular system is a spatial arrangement of honeycomb shells. Unfortunately, the irregular topologies, different air interfaces, and transmission paths of coexistence communities requires significantly more complex representation. Consequently, coexistence communities are better modeled as a directed graph of nodes and edges. A directed graph has graph edges between each of the nodes, which are always unidirectional for communication between nodes of the same wireless system, and may or may not have directed connections to nodes of different wireless interfaces. A device moving through a coexistence community can be modeled as a "random walk". A random walk is a series of connected random hops (i.e., the path is continuous, but largely unpredictable). Further discussion of modeling the movement of a mobile device using directed graphs and random walks is disclosed in greater detail herein (see Optimization Algorithms, and its subsection *Random Graph Theory*).

Each of the members of the coexistence community may or may not have compatible air interfaces. Thus, channel frequencies are not assigned to cells in the traditional frequency reuse patterns. Moreover, time slots on these frequencies are allocated and scheduled to each node in accordance with the traffic model required by application streams currently in use. When considered as an aggregate, all channel frequencies are available to all nodes, and all time slots are available to all nodes. Moreover, this can change as users roam and handoff. It can also change as other wireless networks begin to interfere because of their own application streams.

The topology of the access graph is completely random, due to the movements of the devices in the environment, and the environment itself. As links come and go the graph topology changes since each device has its own trajectory through the environment. Random walks and their applications in arbitrary topologies is the subject of significant research in the fields of stochastic geometry and percolation theory.

For example, IEEE 1900.4, is one such advanced spectrum management technology. The IEEE 1900.4 standard defines network resource managers, operator spectrum managers, and the information to be exchanged between them for enabling coordinated network-device distributed decision making. IEEE 1900.4 improves the overall composite capacity and quality of service of wireless systems in a multiple radio access technologies environment. IEEE 1900.4 requires significant infrastructure e.g., network resource managers, operator spectrum managers, or network reconfiguration managers. Moreover, IEEE 1900.4 does not take into account the differences in levels of interference and interfering nodes experienced by each node in the network.

The present invention provides an alternative decentralized solution. In fact, the present invention renders centralized control points unnecessary. Instead of network-wide assignment decisions being made by a centralized manager, each node makes its own localized decision. The aggregate of the local decisions made by the community of nodes arrives at an optimal point of spectral resource utilization.

In one exemplary embodiment, no decisions are communicated between nodes, only the inputs to make a local decision. As the local decisions are made, the community converges to a globally optimal solution.

Further, various aspects of the present invention enable for communication of the sensitivity to varying quality of service (QoS) levels experienced by each wireless protocol operating in a device, and experienced by the current application mix streaming user data through these protocols. For example, various applications accept different levels of QoS. A variable rate codec may tolerate multiple bit rates, thus, a drop in signal reception may be compensated with a different rate. In contrast, a single rate codec must maintain a minimum bit rate. Consequently, a variable rate codec device has "soft" QoS sensitivity, whereas a single rate device has a "hard" QoS sensitivity.

Other considerations may be taken into account during the optimization process. For example, business models may be incorporated such as with user preferences. A user can adjust their sensitivities if the user is willing to pay for capabilities to be reserved (e.g., in excess of their current need demanded by their current applications). Such user preferences allow for a pre-allocation of resources in anticipation of usage by the device in the future when the sensitivities change. Thus, the user does not notice the change in allocations of excess resources.

Methods—

Referring now to FIG. 1, exemplary system architecture 100 useful in implementing the principles of the present invention is shown and described in detail. The architecture of FIG. 1 comprises in one embodiment a plurality of co-existing wireless devices (i.e. Devices A, Devices B, and Devices C). These devices will be substantially co-located and at least partially interfere with one another. It will further be appreciated that one or more of these co-located devices may exist in a single device (e.g. user equipment ("UE"), such as an exemplary Apple iPhone™), or alternatively may be distributed across multiple differing devices (e.g. multiple user equipment, etc.).

The devices of FIG. 1 comprise a plurality of radio transceivers with different PHYs 102A, 102B, and 102C. Their wireless ranges are indicated by the dotted areas 104A, 104B, and 104C, respectively. Each of these devices is communicating using a different PHY (e.g., Device A might communicate using IEEE 802.11, while Device B communicates using Bluetooth ("BT"), and Device C uses a cordless phone system). Two radio transceivers operating with similar PHYs have an established link shown as 106A, 106B, 106C, respectively. As shown, a subset of the radio transceivers operates in a region of overlap and in contention for the same physical resources.

The system 100 of FIG. 1 is illustrative of a wireless "neighborhood", where Devices A, Devices B and Devices C are "neighbors". As used herein, terms, "coexistence community", "neighborhood", and "global network" are used interchangeably.

Figure 2:
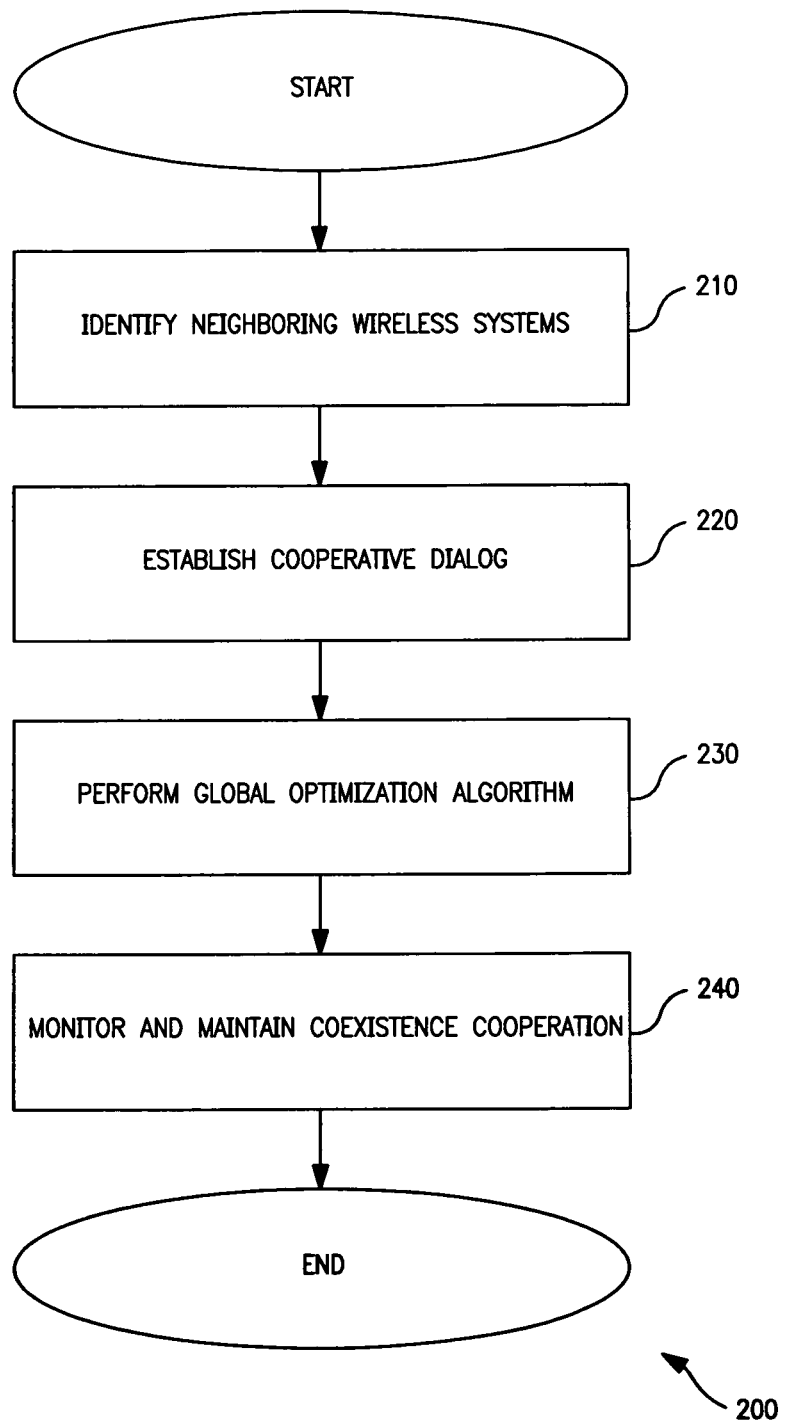
FIG. 2 is a logical flow diagram for one exemplary embodiment of the method of optimizing network performance in a heterogeneous wireless network, in accordance with the principles of the present invention.

Referring now to FIG. 2, one embodiment of the method 200 for optimizing global network performance in a coexistence community according to the invention is illustrated.

At step 210, a radio transceiver identifies its neighboring wireless systems. In one embodiment, the radio transceiver is equipped (in addition to its "native" radio transceiver and processing units) with apparatus enabling multi-lingual reception of one or more potentially interfering devices or systems. As used in this context, the term "multi-lingual" refers to the ability for a device or component to communicate in accordance with two or more wireless protocols. That is, the transceiver would include radio elements and protocol knowledge commensurate with other "non-native" wireless systems in addition to its native elements and protocol.

Figure 2A:
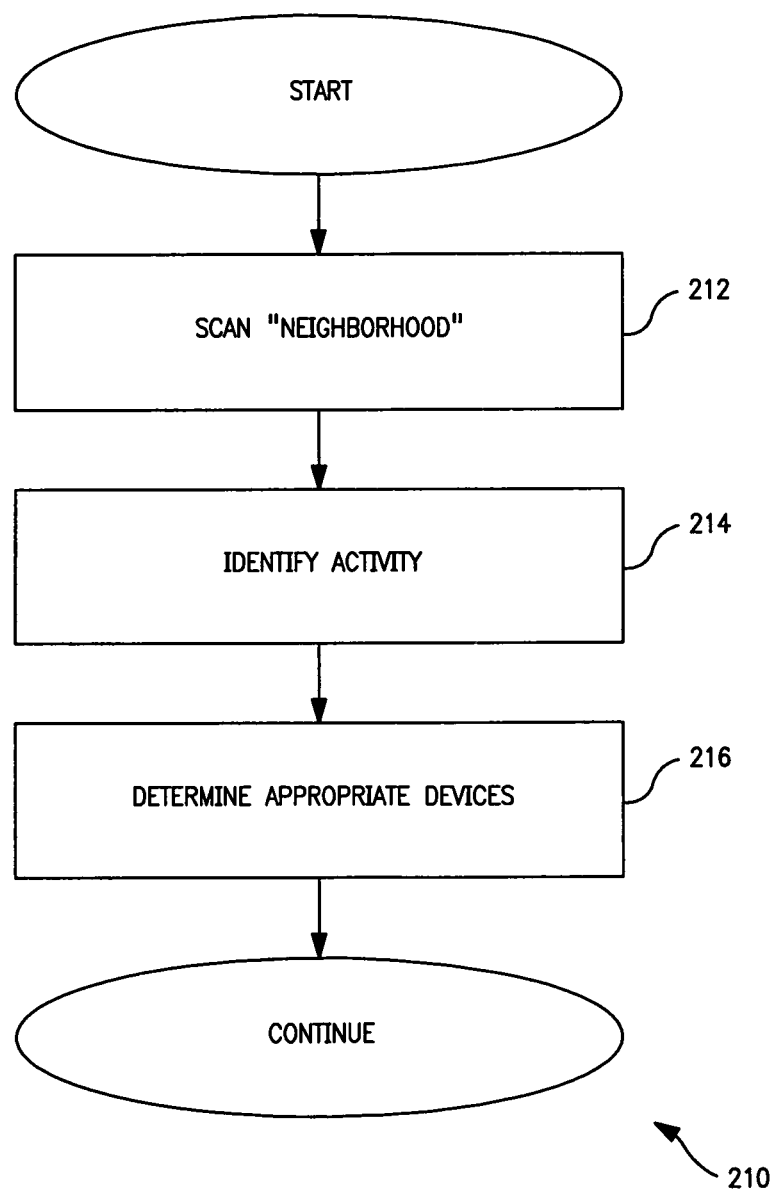
FIG. 2A is a logical flow diagram illustrating one embodiment of the method for identifying the members of a coexistence community according to the method of FIG. 2.

FIG. 2A illustrates one exemplary implementation of the process of step 210. At step 212, the radio transceiver initiates a "scan" of the wireless neighborhood. In one embodiment, this scan comprises a "blind" search; the radio transceiver scans a frequency band for a sufficiently long time interval to detect any potential neighboring radio transmit power. Note that for certain technologies (e.g., Code Division Multiple Access (CDMA) and other spread spectrum systems such as FHSS), detection of radio transmit power may be insufficient to identify the existence of "neighboring" radios; instead, the transceiver may be required to perform an initial receiver operation (e.g. correlation against a specified pseudo-noise (PN) or frequency hopping sequence, etc.). Correlation-type receivers are well known in the wireless arts (see, e.g., U.S. Pat. No. 5,237,587 to Schoolcraft issued Aug. 17, 1993 and entitled "Pseudo-noise modem and related digital correlation method", and U.S. Pat. No. 6,249,680 to Wax, et al. issued Jun. 19, 2001 entitled "Radio transmitter location finding in CDMA wireless communication systems", each of the foregoing being incorporated herein by reference in its entirety), and accordingly not described further herein.

Detection may be accomplished using any number of different criteria, including for example: (i) exceeding a prescribed value of RSSI (received signal strength indication or index); (ii) detecting a PN or FHSS sequence correlation to a sufficient level, or (iii) detecting a synchronization signal. Examples of commonly used synchronization signals include preambles, and pilot signals.

Once detection has occurred (i.e., the prescribed criteria have been met), the radio transceiver attempts to identify the radio activity caused by a wireless neighbor, and select an appropriate device protocol (steps 214 and 216, respectively). The transceiver may identify an unidentified neighboring wireless device or system based on one or more particular characteristics of the device (e.g., identifying a transmission time interval, power versus frequency or time profile (spectrum), signal within a given frequency band or bands. Alternatively, the transceiver may align itself with previously identified systems by decoding a pilot code, or detecting the existence of sidebands or other artifacts, modulation techniques used (e.g., BPSK, DPSK, QPSK, QAM, GMSK, etc.), the aforementioned PN or FHSS code correlation, etc.). If the interferer has an unknown protocol (e.g. a microwave oven or cordless phone) then its RF signature may be used to classify the interferer.

While steps 210-216 are described for "direct" detection/identification of neighboring devices within a wireless neighborhood utilizing a multi-lingual receiver (i.e., affirmatively using a receiver to receive signals in the RF spectrum), it will be appreciated that in alternative embodiments, the detection/identification stage may be "indirectly" performed, such as where the transceiver receives an indication as to the neighborhood constituents, in either a wireless or wired fashion. In one embodiment, the transceiver may receive, via a wireless transmission (e.g. a Bluetooth, Wi-Fi, or other communication), information as to the existence of other neighbors. For instance, where two BT devices have bonded/paired, or one has issued an inquiry, such knowledge may be communicated from the BT stack of the host device to the relevant logic within the device for purposes of identification in the present method.

In yet another embodiment, the transceiver may receive, via a wired message or signal (e.g. via a Universal Serial Bus (USB) or FireWire (IEEE Std. 1394) port connected to a host PC) corresponding neighborhood information. Such information may be indigenous to the device also, such as where the device in question and its prospective neighbors/interferers are fixed and known in advance.

It will also be appreciated that the foregoing steps 210-216 may also be integrated into one operation; for example, where measurements of PN sequence correlation are used to both classify and identify a neighboring transceiver.

Once identified, the system (PHY) type of the detected neighbor dictates a list of behavioral requirements common to the system type (such as five (5) ms frames, OFDMA modulation, symbol rate, etc.) that augment a default performance profile (described subsequently herein). As will be shown, this approach is useful for the algorithm that converges on the optimization result, and is useful to determine the language needed to communicate with the other device.

At step 220, the radio transceiver attempts to establish a cooperative dialog with the neighbors identified at step 210 to receive information that targets the requirements of currently supported applications that utilize each wireless device in the community. This information is codified in "sensitivity" or performance profiles that are shared between the wireless devices in the community. In certain implementations, the content of these profiles may freely change with the dynamic mix of applications (voice, video, or data). Also, at this point broadcast control messages may be decoded by the transceiver. In certain wireless systems, broadcast control messages provide additional details, such as the IP addresses of neighboring systems, etc.

To these ends, in one embodiment, the radio transceiver is equipped with apparatus enabling multi-lingual communication with one or more potentially interfering wireless systems. Such apparatus would include radio elements and protocol knowledge commensurate with such other "non-native" wireless systems; however, unlike other "native" transmitters, such apparatus may be limited in operation (e.g. for purposes of power conservation, die space conservation, program complexity, etc.), and in one variant may only elect to transmit messages at low data rates, or using reliable transport modes, etc. For example, if Device A desires to send a profile message to Device B, then Device A may use the wireless protocol of Device B to communicate this message.

A multi-lingual system has a primary protocol language (its native language), and is enabled to exchange performance profile messages via secondary neighboring protocol languages. Since multi-lingual capability need not be fully featured (e.g., profile messages are in one variant purposely short in length, such that they can be sent at lower data rates, and/or higher reliability settings, etc.), the transceiver need not be optimized for typical manufacturing and or industrial design considerations (e.g., die space, power consumption, processing complexity, etc.). This approach provides significant design (and operational) flexibility from the standpoint that: (i) the non-native interface can effectively be quite low cost and simple (compared to a fully featured interface of the same protocol), and also can be "add on" (not necessarily integrated into the design of the native or primary interface). However, it will be appreciated that nothing precludes integration of the non-native interfaces into the design of the native interface, such as to make the most efficient use of space in the host device, conserve power, make redundant use of similar components or features, etc. Given the recent movement towards physical layer commonality between different wireless systems, it is expected that drastic changes to extant wireless interface designs at the physical layer would not be required to enable multi-lingual functionality according to the invention. Any remaining differences at the MAC layer are easily accommodated with multi-lingual embedded software and firmware executing on an embedded processor of the wireless device.

Furthermore, while step 220 is envisioned as establishing a cooperative dialog between two or more heterogeneous or mixed wireless systems having different operational protocols within a neighborhood, it is appreciated that not all systems may be enabled to cooperate. This may be due to the widespread population of legacy devices, and/or the distribution of devices which are too simple and inexpensive to implement the corresponding features of the present invention (e.g., cordless telephones, low-end cellular phones, etc.). These "non-participating" neighbors may be accounted for in the co-existence management algorithms, as described subsequently herein.

Likewise, the nature of the cooperative dialog may be a "one-time" correspondence (e.g., only the first time that the devices are placed in proximity to one another and powered up), an ongoing correspondence, an iterative process, a triggered or solicited correspondence, a polling or periodic correspondence, or any combination or intermediate degree thereof.

The dialog may also be unreliable (e.g., no QoS or ACK/NACK protocol) so as to minimize overhead and complexity, and/or unicast, multicast, or broadcast in nature (i.e., communications may be specifically addressed to particular devices, or rather sent out to multiple devices in a multicast or broadcast fashion—e.g., an "anyone that can hear this . . . " type of approach).

Figure 2B:
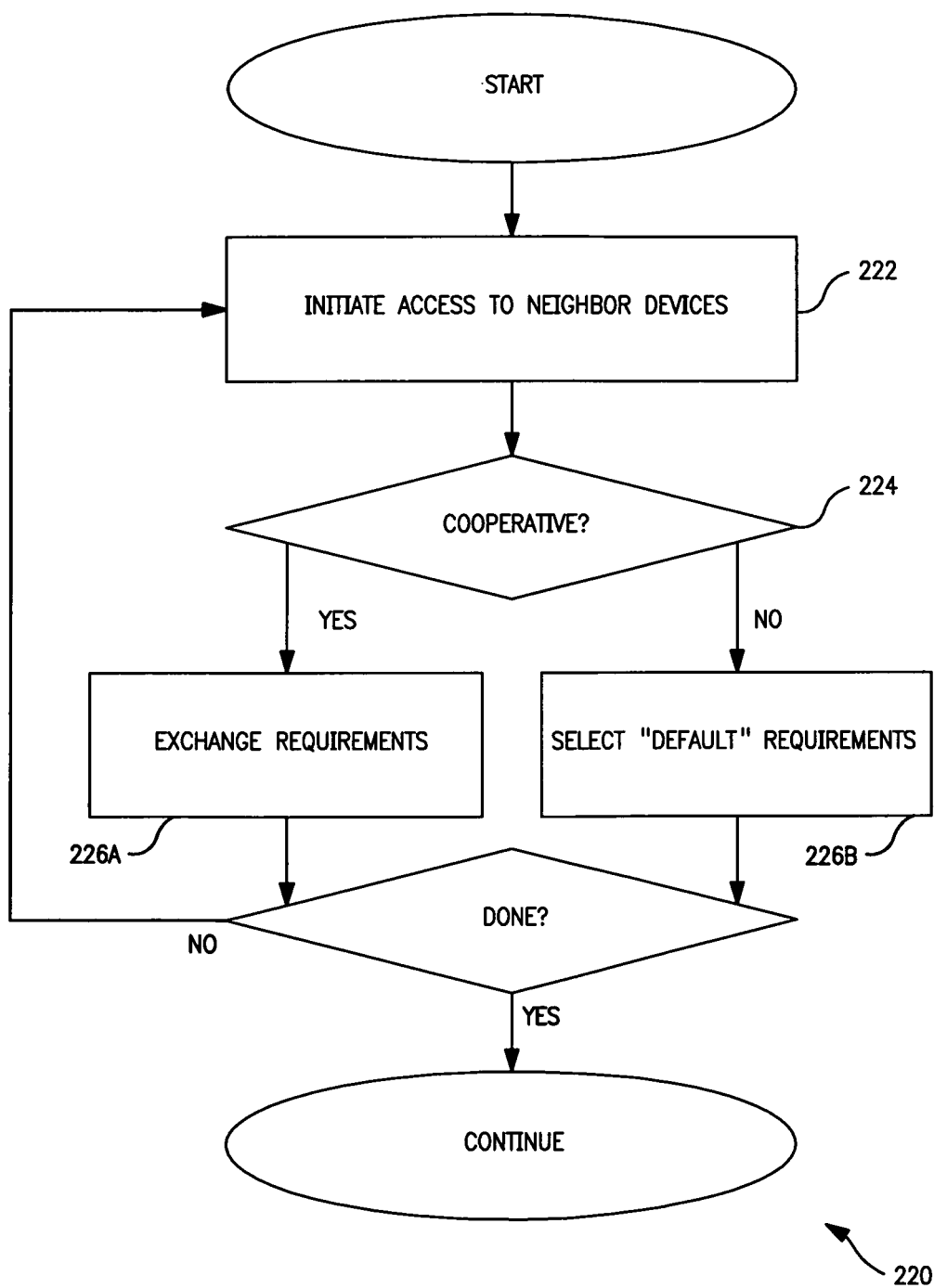
FIG. 2B is a logical flow diagram illustrating one embodiment of the method for exchanging information and parameters related to optimization of a coexistence community, in accordance with the principles of the present invention.

FIG. 2B illustrates one exemplary implementation of step 220 of the method 200 of FIG. 2. At step 222, the radio transceiver initiates access to a detected wireless neighbor. In one embodiment, this access may be directly performed in the "non-native" wireless, system using the aforementioned multi-lingual capability. Alternatively, the non-native access may be a pre-specified wireless system, wherein the wireless system is intended specifically for the identification and negotiation of global network operations and cooperative policy implementation.

After the transceiver has initiated access with the detected neighbor device, the transceiver will determine if the neighbor device is enabled to cooperate at step 224. Cooperation in the present context refers to the ability of a device to communicate according to one or more designated protocols, so as to exchange information for furthering global network policies and/or optimization.

If the neighbor device is able to cooperate, then at step 226A the two transceivers negotiate profiles, which may include a one-way transfer of profile information (unidirectional negotiation), or a two-way exchange of profile information (bidirectional negotiation).

Note also that two-way but asymmetric negotiation may also be utilized; i.e., one device has cooperation capabilities greater than or different than the other(s), and hence the amount and/or type of information flowing from one device may be different than that flowing in the reverse direction.

If the neighbor device is not enabled to cooperate, then at step 226B, the transceiver assigns a "default" profile for that neighboring device. In general, a default profile will be a sub-optimal profile for the neighboring device, and may serve as an incentive for all wireless devices to participate in sharing their profiles. For each neighboring device, profiles and/or requirements are received, or assigned a default value. Note that the default profile value(s) may be assigned based on information obtained by the previous detection and identification processes (steps 210-216 above). For instance, if a PN sequence is correlated, the detecting device may assume that the detected device is a Direct Sequence (DSSS) or CDMA system, and assign an appropriate profile. Similarly, if a frequency-hopping pattern is detected, the device may be assigned an FHSS profile.

In one exemplary embodiment of the present invention, the negotiation of global network requirements is performed using profile messages. In one aspect, the profile message may be adapted to communicate sensitivities to a variety of performance metrics. One exemplary embodiment of a profile message is described in greater detail herein.

In one possible implementation, this transmitted information will be bidirectional; i.e., the sender also receives profile information from recipient of the sent message. Such bidirectional transmission is desirable when the other co-located devices or components may require multiple iterative transmissions before agreeing on or properly formulating an optimization result. For instance, a "test and wait" approach might be employed, wherein a given parameter (e.g., transmit power, sub-carriers used, etc.) is incrementally changed and the effects of the change determined, before additional changes are made.

Furthermore, as previously described simple devices may not be enabled to negotiate global network operation. However, in certain embodiments, the transceiver may be allowed to request supplemental information, or command behavior as to the neighboring devices physical resource utilization characteristics; i.e., a master-and-slave relationship. In such a case, the transceiver may generate or retrieve such information for input into the global network optimization stage 230, despite a lack of negotiation capabilities with the neighboring system. In master-slave operation, the profile information flow may be unidirectional in nature. This is advantageous in certain situations, such as where only the enabled transceiver is multi-lingual.

It will also be appreciated that one device may act as a proxy or pass-through-entity for other devices whose profiles are requested. For instance, a Wi-Fi AP (access point) may act as the proxy for the STAs in the network in terms of providing information to a requesting entity (e.g., another wireless device in the same frequency band). More importantly, the converse is also true; a STA can relay profile messages between access points that are out of range of each other to facilitate global network optimization. Profile data may be stored in the AP and transmitted upon request (which is particularly useful in the case where the STAs are not be enabled to negotiate global network operation, but the AP is), or alternatively the AP may pass the request on to one or more STAs, which if enabled can respond to the AP (or directly to the initiating device).

While cooperation between devices as described herein primarily contemplated as a wireless transmission of data, wired solutions can be implemented as well using architectures, such as for example using that disclosed in co-owned and co-pending U.S. patent application Ser. No. 12/006,992 filed Jan. 7, 2008 and entitled "Method and Apparatus for Wireless Device Coexistence" previously incorporated herein by reference in its entirety.

At step 230, the radio transceiver performs global optimization algorithms, based at least in part, on the requirements and profiles for each wireless device retrieved in step 220. In one embodiment, the global optimization algorithm performs an optimization for a plurality of objectives (e.g., to reduce received interference, increase throughput, reduce latency, maintain QoS requirements, etc.), based on the relationships defined within one or more profiles. Once all the systems have received the performance profiles of each other (or at least a subset have received profiles on others in the community), optimizing algorithms within each system in the coexistence community can take over, making the local decisions within each system that may be "fair" for all neighbors.

It will be appreciated that while one implementation of the invention comprises (i) each member of the community having knowledge of the profiles of the other members of the community; and (ii) each member "actively" participating in the optimization process (or at least having knowledge of it), the invention may also be implemented such that certain members of the community are partially or purely passive. For example, in one such variant, certain non-enabled devices of the type previously described herein are passively detected by "active" members and identified (see, e.g., steps 210-216 of the method 200 previously described). A default profile is assigned to these passive or non-participating members, and the active or participating members of the community will individually or collectively make adjustments in one or more of their operational parameters so as to achieve the desired community co-existence goals (e.g., reduced interference). The non-participating or passive members are in effect considered to be completely static and unchangeable, and the remaining participating members will change to the maximum extent practicable (without violating other rules or policies, such as excessive wireless link latency). This approach has the advantage of allowing a certain degree of accommodation of non-enabled/non-participating membership within the community in terms of performance and optimization, yet is also limited by the degree to which participating or active members must alter or distort their operation in order to achieve the desired community goals. For example, it may be that achieving certain goals (such as reducing interference below a prescribed level) is unachievable through only the actions of the active community members, assuming the aforementioned rules or policies limiting their behavior.

Figure 2C:
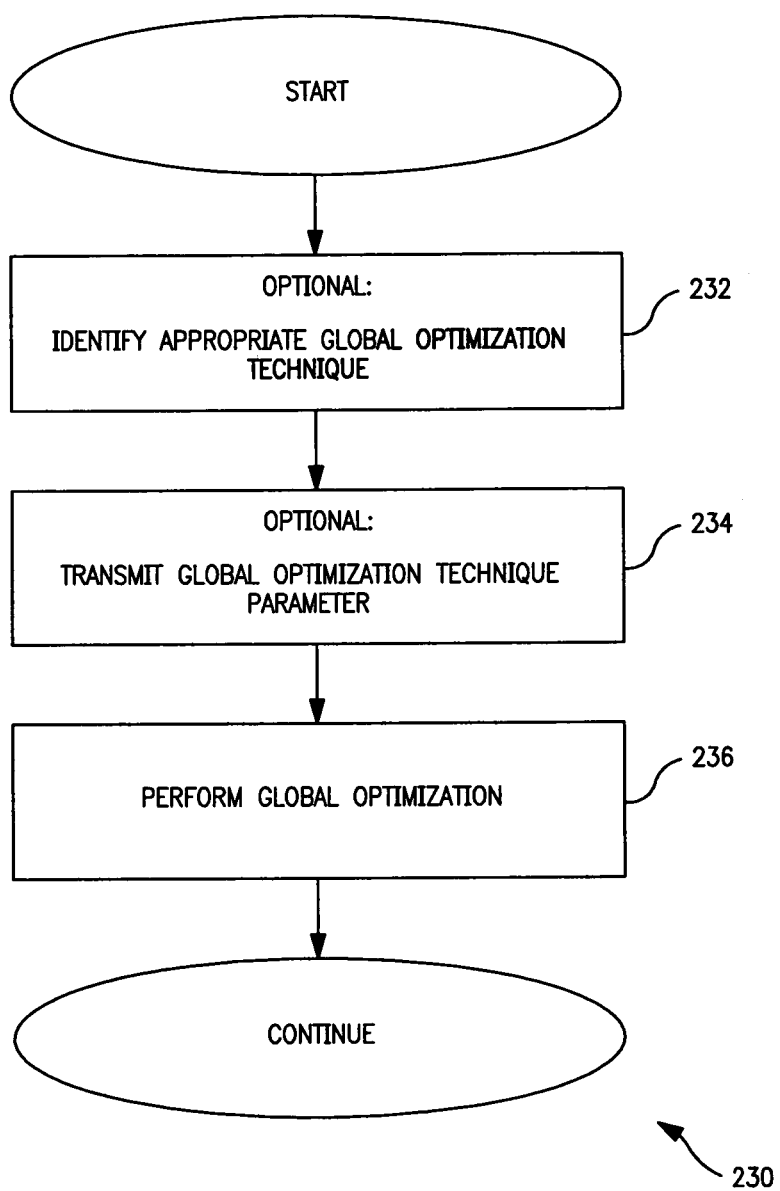
FIG. 2C is a logical flow diagram illustrating one embodiment of the method for performing global optimization of a coexistence community using a programming algorithm, in accordance with the principles of the present invention.

FIG. 2C illustrates one exemplary implementation of step 230. At optional steps 232 and 234, the radio transceiver identifies an appropriate algorithm for global optimization of community operation, and distributes the selected technique to other cooperative neighbors. In one variant, to provide for simpler dialog between cooperative agents, a pre-defined set of global optimization algorithms can be selected from by active participants. A "master" device may also be negotiated, such that the master makes decisions regarding which algorithm to choose for the process, rules and policies, etc., and the other slave (yet active) devices will accede to the master's selections and rules.

In another variant, such cooperative agents may need to negotiate over a plurality of global optimization algorithms; such a case could occur when, for instance, one member of the neighborhood has only a subset of algorithms.

In one embodiment, the weighting defined within a received message is assigned corresponding to a linear relationship (for example, the value of throughput to system B may be proportionately twice (2×) as important as latency). As is well known, linear programming (LP) is a technique for optimization of a linear objective function, subject to linear equality and linear inequality constraints. In effect, LP helps determine how to achieve the optimal outcome (such as maximum efficiency or throughput, or lowest power consumption) in a given mathematical model system, and according to a list of requirements represented as linear equations.

Alternatively random graph solutions may also be adapted for solving the wireless coexistence problem between heterogeneous wireless systems in a community. Random graph solutions are explored within certain mathematical fields, such as stochastic geometry, and percolation theory discussed hereinafter in greater detail.

At step 236 of the method 230, a global optimization algorithm is performed with each (participating) neighboring system's profile establishing a weight (or sensitivity) for a pre-defined set of objectives. By collectively analyzing the set of systems, and their "preference" or importance for each objective, the transceiver can determine its optimal behavior (with respect to the rest of the neighborhood).

During step 236 of the illustrated embodiment all other transceivers which are likewise enabled in the coexistence community are similarly performing an identical process. The collective behavior should agree on an optimization result either implicitly (i.e., due to identically selected algorithm, and inputs), or directly (e.g. as in a master-slave relationship). By executing the optimization result at each device(s), the coexistence community as a whole behaves in a "good neighbor" manner, so as to minimize disruptions in communication based on the parameters that are desirable to each individual system within the neighborhood. In this manner, greedy or otherwise "anti-social" behaviors (such as each system blindly increasing antenna gain to increase performance, thereby causing the entire neighborhood to also increase antenna gain), can be arbitrated peacefully (e.g., one transceiver gives up data rate for improved reliability, another transceiver reduces antenna gain during periods of inactivity, one switches to different carrier or sub-carrier frequencies, etc.).

It will also be appreciated that a "test and wait" approach similar to that previously described can be used so as to mitigate uncontrolled excursions within the system. If each enabled device is too dynamic in its parameter modifications, the community as a whole may end up "chasing its tail" with respect to one or more parameters, with each device in effect trying to compensate for the other's changes in real time. Hence, a stabilization period and/or gating criteria can be factored into the logic of the optimization algorithm(s), so as to avoid such parametric excursions. For example, it may be that rate limitations on changes in transmitted power are imposed for all members (e.g., only n or less power changes every m seconds), or other parameters can only be changed at a maximum prescribed frequency or under certain conditions. Alternatively, other methods to compensate for excessive instability include: hysteresis (i.e., memory), quantizing and or limiting parameter changes.

Finally, at step 240 of the method 200, the radio transceiver community cooperatively operates according to the explicitly negotiated or implicitly derived policies and behaviors. Thus, each member at least periodically or anecdotally (i.e., upon occurrence of a prescribed event, upon a mode change such as exit from a sleep mode) monitors the neighborhood for changes, and maintains its operation according to these policies.

In one embodiment, the global optimization algorithm need only be performed to initially establish correct optimization results; thereafter, the radio transceiver may tailor its performance according to such optimization results without having to run the algorithm iteratively. Such independent operation allows wireless devices to make fine grained adjustments without requiring excessive exchange of, profile messages. This reduces the overhead of communicating such messages and the frequency with which the globally optimizing algorithm is executed. Thus, the globally optimizing algorithm in this embodiment is only used for coarse grain adjustments.

In an alternative embodiment, the global optimization algorithm may need to be run iteratively or periodically, such as where a master must monitor the performance of a slaved device, and dynamically adjust fairness accordingly.

Figure 2D:
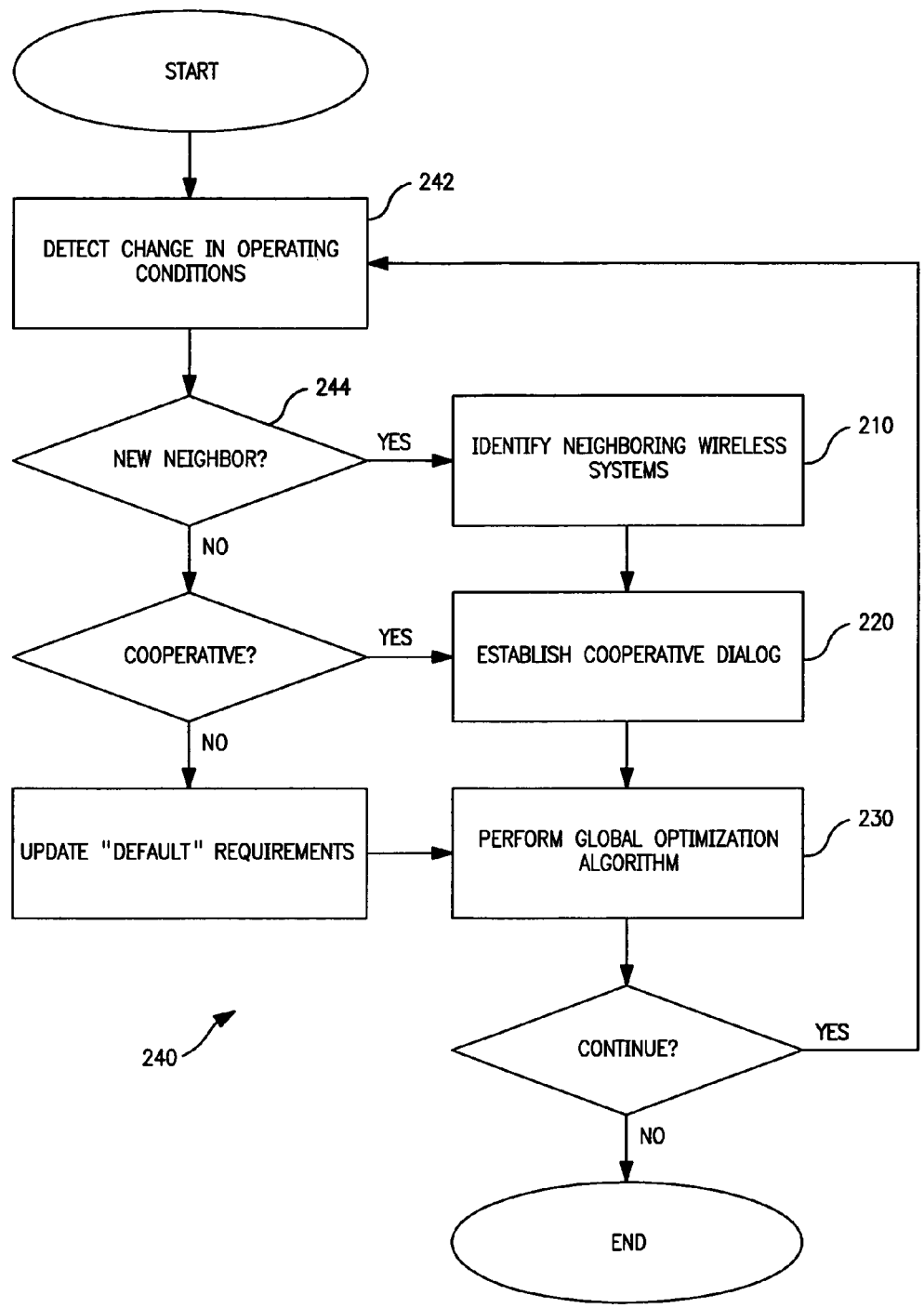
FIG. 2D is a logical flow diagram illustrating one embodiment of the method for dynamically adjusting the optimal point of the fairness goal, in accordance with the principles of the present invention.

FIG. 2D illustrates one exemplary implementation of step 240 of the method 230 described above. At step 242, the radio transceiver initiates a monitoring protocol to detect any potential changes; i.e., it monitors both itself (e.g., looking for a change in operation or user behavior within a particular device) and its co-existence neighborhood (e.g., looking for new neighbors, uncooperative neighbor, neighbor requesting change to policy, etc.). In the event a change is detected, optional dynamic adjustment of the optimal point of one or more global fairness goals or criteria may be performed.

At step 244, the transceiver determines if the source of change is a new arrival to the cooperative neighborhood. If so, the process jumps to step 210 of the process 200, and identifies and adds a new neighbor as previously described herein.

If the change is not caused by a new neighbor, then the transceiver cooperates with any implicated neighbors to adjust its global optimization algorithm via step 220 (i.e., establishes necessary communications, etc.).

If there are no cooperative neighbors, then the transceiver may choose to review and reassign its "default" profiles for the neighborhood, before recalculating its global network optimization results at step 230. For instance, it may be that a default profile selected initially for a detected device is erroneous. Such errors can be directly identified through innate "intelligence" of the algorithm (e.g., being able to evaluate detection data and identify one or more inconsistencies or deficiencies that stem from a default classification, such as for example detecting a frequency-hopping sequence correlation for a device which has previously been assigned a default DSSS/CDMA profile).

Alternatively, a "dumb" approach can be used, where no identification need be performed. Rather, the algorithm just blindly follows a prescribed sequence of profiles, in effect changing them one at a time until the error or change is no longer detected.

At the conclusion of step 240, the transceiver revisits step 230, and the optimal point of the target or objective is adjusted. In an exemplary embodiment, this adjustment will trigger a recalculation of one or more performance algorithms. As previously described, that calculation (in a cooperative neighborhood) will be executed at one or more of the neighborhood's cooperating devices so that the neighborhood will operate according to the adjusted optimal or target point.

The transceiver may also opt not to continue to monitor and detect changes in operating conditions. While step 240 is envisioned as advantageous for optimizing neighborhood operation, it is appreciated that other constraints (e.g., power consumption, processing power, etc.) may negate or outweigh the benefits of "constant" vigilance. Therefore, the nature of the monitoring may include an ongoing or continual monitoring, a triggered monitoring, a periodic monitoring, a polling monitoring, or any combination or degree thereof. Moreover, multiple "composite" or hierarchical schemes may be employed, such as where continuous or periodic monitoring is utilized when power conservation is not an issue (e.g., the device has a high state of battery charge, is plugged into an AC adapter, etc.), and a triggered or event-driven monitoring scheme when power conservation is an issue.

If it is determined that there is a benefit in continuing to monitor and detect changes in operating conditions, the process flow restarts at step 240.

It will also be recognized that in other embodiments, the approaches described herein may be applied on an intra-device basis (i.e., within the same device), and/or used in conjunction with other interference compensation or mitigation techniques. For instance, the techniques and apparatus described in co-owned and co-pending U.S. patent application Ser. No. 12/082,586 filed Apr. 11, 2008 and entitled "Methods and Apparatus for Network Capacity Enhancement for Wireless Device Coexistence" previously incorporated herein by reference, may be used consistent with the present invention.

U.S. patent application Ser. No. 12/082,586 discloses, inter alia, methods and apparatus for enhancing the operation and capacity of a network having associated devices with multiple air interfaces that share bandwidth within a spectral (frequency) band. For example, many portable computing or electronic devices utilize multiple air interfaces for different purposes (e.g., WLAN and PAN), yet these interfaces may interfere with one another (and those of other proximate devices) under certain circumstances. This interference can adversely impact the performance and user experience of the affected devices, such as by reducing WLAN data rates. In one variant of the disclosure, the portable device is made to operate in a power-saving mode at all times (irrespective of whether the device is utilizing battery power, DC power supplied from an AC wall or inductive converter, or both), such that the WLAN interface must in effect be "woken up" whenever a data transmission/reception of significance is required. This way, the WLAN's use of the conflicting frequency spectrum (e.g., 2.4 GHz) is minimized in favor of use of that same spectrum by the client's BT device(s) such as wireless headset, mouse, keyboard, etc.

In another variant, the foregoing interference mitigation scheme is further enhanced by management of various operational modes for the BT interface, in effect throttling the BT interface's use of the spectrum when such use would negatively impact WLAN use of the spectrum by the device, or other WLAN users in proximity (e.g., on the same AP). This management scheme can be made dependent upon one or more operational criteria, such as for example the level of network traffic, number of user, and so forth. Depending on these operational criteria, differing operating rules are implemented so as to achieve the goal of providing the users of the network with the best overall user experience possible, and having their devices act as "good neighbors" to other local devices by minimizing interference within the common spectrum.

It will also be appreciated that while techniques such as those referenced above can be implemented on an intra-device (i.e., within the same device) basis, they may also be adapted for use on an inter-device (i.e., across two or more different devices) basis, depending on the particular application. For instance, two closely co-located but separate devices might be modeled similar to multiple air interfaces within a single device for purposes of global or community optimization.

As previously indicated, another salient aspect of one embodiment of the invention is its ability to dynamically change the optimal point of the "global fairness goal" for the community, based on inter alia the dynamically changing needs of applications supported on the wireless devices and systems within the community. For instance, instantiation of a video streaming application having associated QoS or timing requirements over a wireless bearer (e.g., a user wants to stream a video over their 3GPP IMS or other multimedia bearer) may invoke a change in the global optimization "fairness" point, especially where the other members of the community are not significantly prejudiced. It may be that to support the QoS/timing requirements of the streaming device, another device in the community may need to reduce its data throughput (e.g., become more "bursty" or intermittent), reduce its radiated power, etc. Hence, the definition of "fairness" is skewed somewhat ("quasi-fairness"), with the streaming participant being prioritized somewhat over the other participants in order to support the requested application operation. The global optimization algorithm may accomplish this by invoking a "master-slave" model of the type previously described, wherein the streaming device assumes the master role, and dictates (within certain prescribed limits) the behavior of the slave(s) so as to accomplish the necessary application support (e.g., maintain sufficient resources to support the QoS requirements of the streaming video in the foregoing example).

Apparatus—

Figure 3:
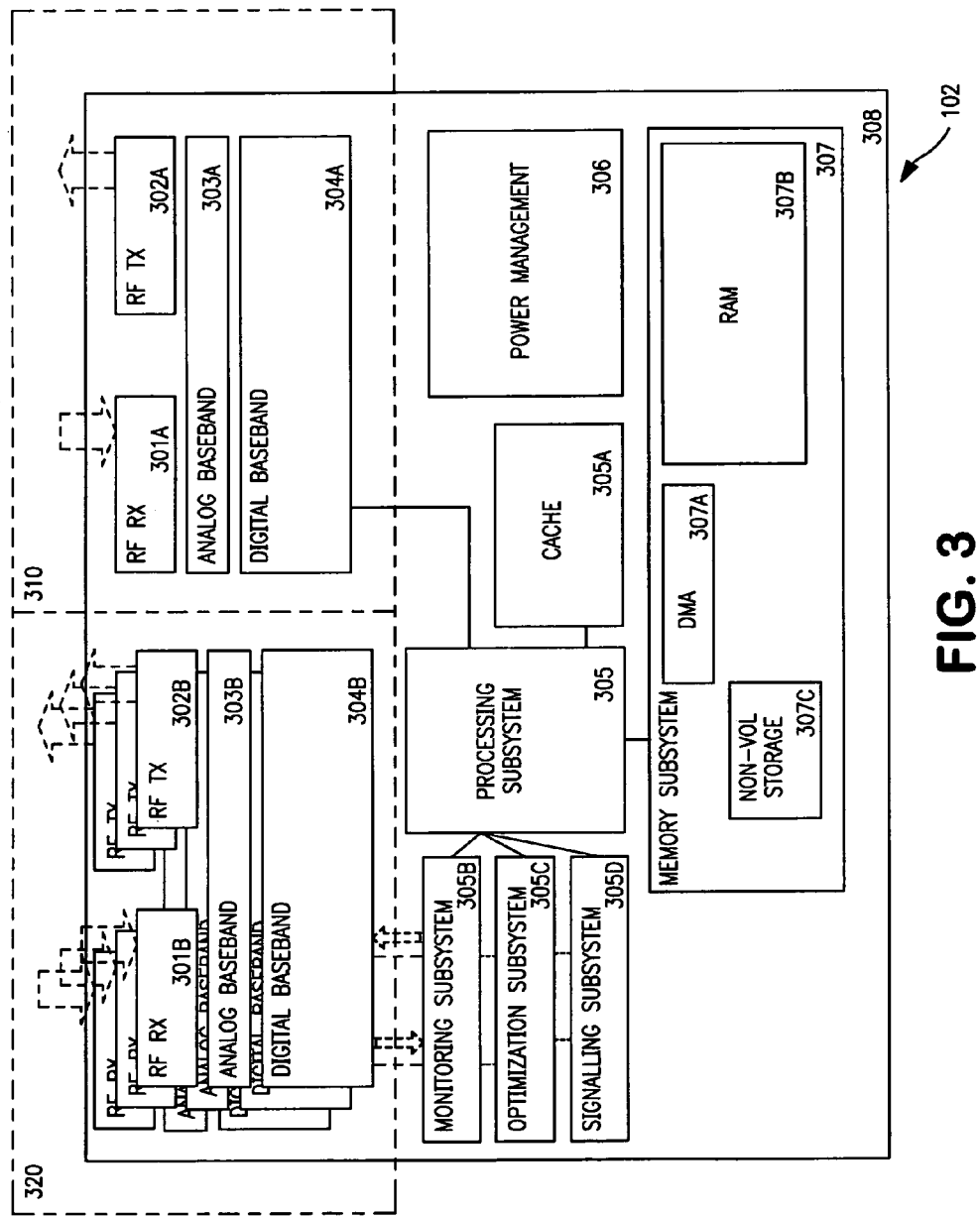
FIG. 3 is a block diagram illustrating one embodiment of an exemplary apparatus having multilingual capability for communicating parameters related to performance optimization of a coexistence community in accordance with the present invention.

Referring now to FIG. 3, an exemplary transceiver apparatus 102 configured to implement the methods of the present invention is illustrated. Such an apparatus 102 may comprise for example a portion of a mobile client or user device such as a mobile telephone, laptop computer, PDA, although the apparatus may also be useful in non-mobile (fixed) applications.

The exemplary transceiver apparatus 102 of FIG. 3 comprises one or more substrate(s) 308 such as PCBs that further include a plurality of integrated circuits and subsystems. These ICs and subsystems include a processing subsystem 305 (such as a digital signal processor (DSP), microprocessor, RISC core, gate array, or plurality of processing components), memory subsystem 307, transceiver subsystems 310, 320, as well as a power management subsystem 306 that provides electrical power to the transceiver apparatus 102.

The embodiment of the apparatus 102 shown in FIG. 3 comprises, at a high level, a transceiver circuit 310 configured to operate using a "native" mode of operation using a first PHY and/or device protocol (A). In addition, one or more other transceiver circuits 320 are included to add multi-lingual functionality (e.g. PHY and/or device protocol B, C, ... N). These other circuits 320 may for example comprise different types of air interfaces which might be commonly encountered. For instance, and purely for illustration purposes, the native interface 310 might comprise a Wi-Fi interface, and the non-native interfaces 320 a Bluetooth, WiMAX, and PAN (802.15) interface.

While multiple subsystems are illustrated, it is appreciated that future developments may consolidate the multi-lingual portion(s), in whole or in part, with the native transceiver circuit (PHY A) 310.

As shown, the transceiver subsystems each comprise a digital baseband 304, analog baseband 303, and RF components for RX 301 and TX 302 of the type well known in the wireless arts.

The processing subsystem 305 may comprise one or a plurality of processors (or multi-core processor(s)). Additionally, the processing subsystem also comprises a cache 305A to facilitate processing operations. In the illustrated embodiment, additional subsystems for monitoring the coexistence neighborhood 305B, global optimization 305C, and signaling 305D are also provided. As shown in FIG. 3, these subsystems may be implemented in software or hardware which is coupled to the processing subsystem 305. Alternatively, in another variant, the subsystems may be directly coupled to the transceivers, and operate independently of the processing subsystem 305.

The disclosed embodiment of the apparatus 102 furthermore logically couples the monitoring circuit 305B, to the global optimization circuit 305C, and optimization circuit 305C the signaling subsystem 305D. The monitoring circuit, inter alia, detects an event associated with the changing conditions of the coexistence community as previously described herein. The optimization subsystem determines the appropriate optimization results; i.e., those which would optimally benefit the neighborhood. The signaling circuit controls signaling to each of the non-native systems (e.g., other enabled devices in the neighborhood), thus enabling multi-lingual mode of operation.

The monitoring subsystem 305B also ensures that the radio transceiver community is cooperatively operating in accordance with the optimization results generated from the optimization subsystem 305C—and thus monitors for changes, and triggers corrective action where required.

In one embodiment, the detection circuit (not shown), part of the monitoring subsystem 305B, monitors according to a timer-based scan, utilizing in succession each of the non-native transceivers B, C, etc. 320 (e.g. for initial detection, new arrivals, etc.).

In another embodiment, the detection circuit initiates a detection scan based on a message received from the processing subsystem 305 (e.g., based on changes to application requirements, higher layer messaging, etc.).

In yet another embodiment, the monitoring subsystem 305B may monitor one or more aspects of the operation of the native transceiver 310 (e.g., for a sudden increase in bit error rate, etc. that might be indicative of neighborhood changes or new arrivals).

In the illustrated embodiment, the optimization subsystem 305C determines the appropriate optimization result. In one variant, the optimization circuit implements a linear programming algorithm.

In another variant, the optimization circuit implements one or more randomized optimization parameters, such as for example random graph analysis, stochastic geometry, and or percolation theory algorithms. The results of such random mathematical optimizations are processed with one or more analysis techniques. The implementations of optimization may be performed in dedicated hardware, or alternatively, flexibly implemented within software. In yet another embodiment, the optimization result may be previously stored to memory 307, for certain predefined configurations.

Lastly, the signaling subsystem 305D comprises programming adapted to transmit and receive messaging relating to a performance profile and/or a global optimization algorithm. The signaling subsystem may additionally comprise pre-defined profile information, useful for standardizing communication with other non-native languages via the non-native transceivers 320.

The processing subsystem 305 is in data communication with the memory subsystem 307. The memory subsystem comprises a direct memory access (DMA), operational random access memory (RAM) 307B, and non-volatile memory 307C of the type well known in the digital processing arts.

"Community" System—

Referring now to FIG. 4A, an exemplary coexistence community 400 useful in implementing the principles of the present invention is shown and described in detail. The architecture of the apparatus of FIG. 4A comprises, in one exemplary embodiment, a plurality of co-existing wireless devices (i.e. Device A 102A, Device B 102B, and Device C 102C as shown in FIG. 1 herein). These devices are substantially co-located so that they at least partially interfere with one another.

Each device 102A, 102B, 102C comprises a plurality of radio transceivers of different types 310, 320A, 320B. For purposes of illustration, each of these devices is communicating using a different PHY and/or device protocol (for example, Device A might communicate using Wi-Fi (e.g., 802.11n), while Device B communicates using Bluetooth ("BT") 2.0, and Device C uses wireless USB). Each device is multilingual, as indicated by their "native" wireless transceiver portion 310, and their non-native wireless transceiver(s) 320A, 320B. During coexistence operation, the transmission of profile information occurs on the non-native links 402A, 402B, 402C. Specifically, the aforementioned links may be non-native to one device, but native to another. Alternatively, two devices may each use similar non-native or native PHYs and/or device protocols to communicate if desired.

As shown, one device 102A transmits its profile information to another device 102B via a non-native link 402B, and its profile information to device 102C via another non-native link 402C. Devices 102B, and 102C, respectively, receive the profile information on their native wireless interfaces. While receive paths are not explicitly shown for sake of clarity, it is readily understood by those skilled in the arts, that the receive paths for profile information are logically connected and functional.

In an alternative embodiment (FIG. 4B), the exemplary coexistence community 410 operates with a master transceiver device 102A. The architecture of FIG. 4B comprises in one embodiment a plurality of co-existing wireless devices (i.e., Device A, Device B, and Device C). These systems are again substantially co-located and at least partially interfere with one another. However, only one device 102A has multi-lingual capability.

As shown, the radio transceiver of device 102A transmits its profile information to another device 102B via a non-native link 402B, and its profile information to another 102C via another non-native link 402C. Devices 102B, and 102C, respectively, receive the profile information on their native wireless interfaces. Alternatively, the first device 102A may instead receive information from the second device 102B via its native link (not shown), and likewise for the third device 102C.

Figure 4C:
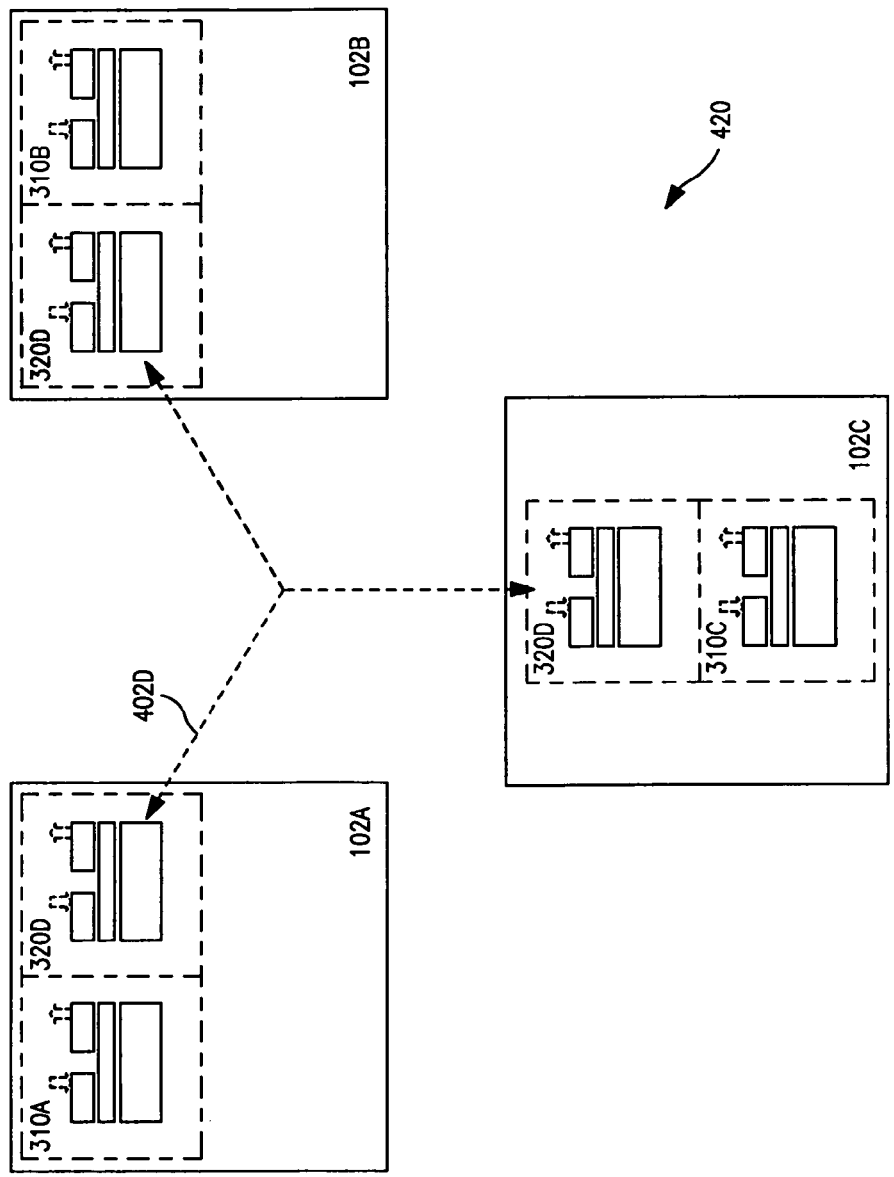
FIG. 4C is a block diagram illustrates one embodiment of a system having a coexistence community communicating using a dedicated language capability for communicating parameters related to performance optimization.

FIG. 4C illustrates an alternative embodiment of a coexistence community 420 operating with a dedicated wireless interface 320D according to the principles of the present invention. The architecture of FIG. 4C comprises in one embodiment a plurality of co-existing wireless devices (i.e., Device A, Device B, and Device C). As before, these devices are substantially co-located and at least partially interfere with one another. However, all of the devices are multi-lingual capable and maintain a separate link 402D common to all.

Optimization Algorithms—

Certain fields of mathematics are especially well adapted for analysis and optimization of interference in a coexistence community. Accordingly, in one exemplary aspect of the invention, random graph theory, stochastic geometry, and/or percolation theory can be used by a distributed algorithm running on each device in the community. In one exemplary embodiment, the distributed algorithms can use these techniques to minimize the impact of interference in the community on the performance of applications running on each device by converging on a globally optimal solution. Each node running the algorithm maintains local parameter values that collectively describe the globally optimal allocation of the shared resources of the community. For example, if two nodes create interference to a third node when they transmit simultaneously, the parameter values may determine how the two nodes alternate their transmissions in time and/or frequency to avoid the interference experienced by the third node.

The following subsections provide detailed descriptions of the distributed algorithms and their applicability within the framework of the disclosed invention.

Random Graph Theory—

As previously mentioned, the irregular topologies, different air interfaces, and movement of nodes in coexistence communities can be represented using a number of mathematical techniques. For instance, coexistence communities may be modeled using a directed graph of nodes, each node having a connection or "graph edge" with one or more other nodes. These connections show the per-hop transmission path for communication and/or interference between the nodes. Generally, graph theory describes topologies or relations between interconnected nodes. A "random graph" has substantially random connections between its nodes, in other words, each connection is randomly present with a certain probability.

Figure 5A:
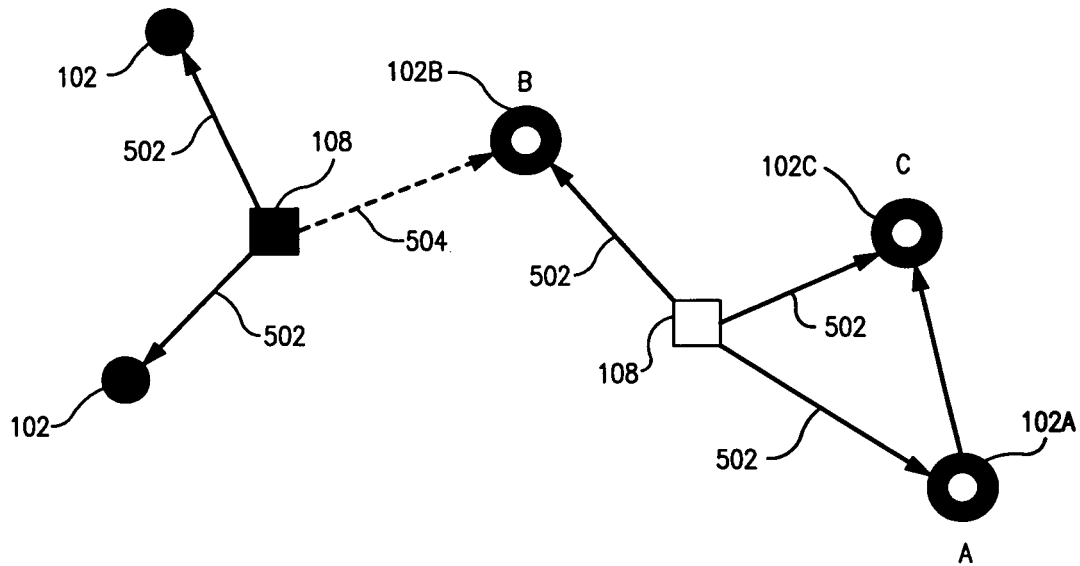
FIG. 5A illustrates the effects of movement on random graph representation of the wireless coexistence community of FIG. 5.

Referring now to FIG. 5, one exemplary random graph 500 of a coexistence community is illustrated. The coexistence community comprises a first and second system. The coexistence community is represented with an arbitrary directed graph of nodes (nodes may be either clients 102 or base stations 108), each node having an arbitrary collection of graph edges with other nodes. The solid directed line edges 502 are for transmissions within a system (including internal interference within a system). The dashed directed line edges 504 are for transmissions between systems (i.e., interference between systems). As shown, node B 102B experiences interference from both the first and second system. At a slightly later point in time, FIG. 5A illustrates the random graph of the coexistence community after Nodes A 102A and C 102C have randomly walked to a new location. The graph topology noticeably differs.

Given any collection of nodes, the interconnection of these nodes is referred to as the collection's map. Each connection may be weighted with one or more values that describes the reliability of the link for communication, the probability of interference, etc Furthermore, the values as perceived at the connected nodes of the connection may be equivalent, or non-equivalent (for instance, if the receiver of the connection has not updated the transmitter of the connection with the latest probability of the connection). In certain models, useful for explanatory purposes, the nodes may be hierarchically connected in layers, where each branch has a direct impact on subsequent connections (e.g. tree topologies). Alternatively, the nodes may be connected without any relation, i.e. the existence of a connection between nodes is unrelated to any other connections (e.g. mesh and partial mesh topologies).

When considered individually, each random graph, or topology has a relatively small number of optimal distributions of the shared resources of the community. Using classical methods, the optimal distributions of any random graph bears little resemblance to another random graph. Thus, a comparison of any reasonable number of random graphs for a universally applicable optimal weighting proves unfeasibly difficult, and computationally expensive.

Instead, a coexistence community can be modeled as a corresponding number of nodes each having values defined by a sensitivity profile (described hereinafter), and a time-varying interconnection graph, also described as a random graph. Each of the nodes performs a local algorithm to generate a new distribution of shared resources based on its sensitivity profile, the sensitivity profiles sent previously by its neighbors, and the probability values for its connections. When a node receives a list of sensitivity profiles from a neighbor, it re-broadcasts the list to its other neighbors along with its own sensitivity profile. When all nodes have shared their sensitivity profiles throughout the community, and each has the same probability values for the connections, the local algorithms in each node will generate the same distribution of shared resources. Since these inputs are dynamic, the nodes in the community regularly update one another during each designated time interval between executions of the algorithm.

For example, consider a three-node coexistence community which contains Node A, Node B, and Node C, all of whom create interference with all other nodes. Nodes A and B are running a web browsing application that is insensitive to jitter, whereas Node C is running a video application that is highly sensitive to jitter. The nodes measure the probability of successfully receiving data and/or interference on each inbound connection. The nodes also generate their sensitivity profiles based on their currently running applications. Once completed, the nodes communicate their sensitivity profiles and connection probabilities by either contending for access to the channel using Carrier Sense Multiple Access with Collision Detection (CSMA/CD), or by transmitting in a pre-allocated frequency and time resource for control signaling between nodes during the designated time interval for propagating them.

In this scenario, the local algorithm would generate a constantly recurring time interval for Node C, and generate a recurring time interval for Nodes A and B that is variable in length and non-constantly recurring. The bursty nature of this interval causes the applications of Node A and Node B to experience jitter when they communicate over their connections. For example, if the Node A application consumes all of the available time between the constantly recurring time intervals, the Node B application must wait for the medium to become available. This unanticipated extra delay in communication causes jitter. As shown herein, additional fields in the sensitivity profiles are utilized by the algorithm to determine the exact value for the duration and repetition rate of these intervals.

Figure 6:
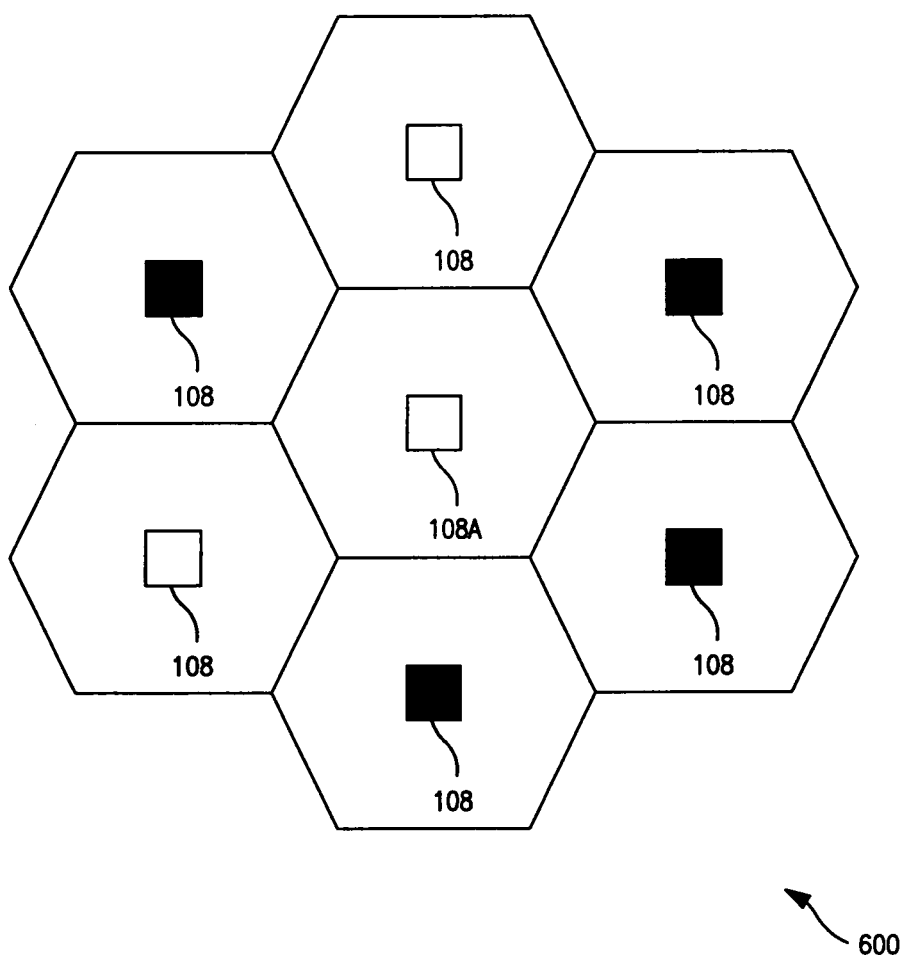
FIG. 6 is a graphical illustration of a typical "honeycomb" wireless coexistence community.

Referring to FIG. 6, seven (7) base station nodes 108 are arranged in a honeycomb configuration 600 where the center base station 108A experiences interference from all other nodes. In this example, the base stations have a plurality of transmission frequency options, and have applications that demand 100% utilization of the channel. In this case, the local algorithms initially pick a random starting transmission frequency. Based on the connection measurements exchanged with that frequency allocation across base stations, the local algorithm computes new frequency allocations for each base station. If interference is not experienced by a base station for a given channel allocation, no frequency adjustments are made. If interference is experienced for a channel allocation, the algorithm randomly selects a new frequency from the list of available frequencies. This process continues iteratively until the globally optimal result, e.g., the well-known frequency reuse pattern with factor $\frac{1}{7}$ (one seventh), is achieved.

In this way, each device running its own copy of the local algorithm uses the sensitivity profiles of the community to compute the globally optimal coexistence solution. The global community will move to a stable solution, if the community of devices satisfies certain topological constraints (described hereinafter). A key component for rapid and stable inter-operation is the degree of connectivity between the nodes. Depending on this connectivity, it can take several hops to disperse the sensitivity profiles among the nodes. Thus, in one embodiment, each device may initially perform erratically based on incomplete profile knowledge; however, as the profile information propagates to all nodes in the network, the behavior will stabilize. In alternate embodiments, each node may wait until their profile has had a chance to propagate through the network before initiating the coexistence calculations. Simulation examples are provided and discussed in greater detail subsequently herein (see discussion of localized algorithm for node coexistence).

In yet another embodiment, a configurable parameter is used in each device that specifies the length of time between updates of the algorithm to compensate for the random graph topology, In two variants, the configurable parameter may be expressed in time slots (for TDMA systems), or milliseconds (for TDD or FDMA systems). The maximum time to reach the nearest neighbors of any node is bounded by twice the node degree (number of nearest neighbors). Accordingly, in one variant, this configurable parameter may be limited to the maximum time, or a proportion thereof.

Finally, when a node receives communication from any other unique node, the node may attempt to add the unique node to its coexistence community. In practical aspects, this would increment a neighbor count value. In one embodiment, this neighbor count value is used to compute how long to wait between algorithm updates. In one variant, the count will decrement after some aging time period if the node fails to hear again the unique node (i.e., the unique node is no longer active).

Stochastic Geometry—

Stochastic geometry has been used to model wireless networks, such as cellular systems, ultra wideband, cognitive radio, femtocells, relay networks, and ad hoc networks. Stochastic geometry techniques are adapted to quantify otherwise random system parameters, such as the random spatial distribution of nodes, shadowing, and fading. Thus the received interference in a coexistence community is not a single constant value, but a stochastic variable (derived in part from a stochastic geometry).

Stochastic geometry provides much more efficient methods for determining a reasonably optimized map. By learning the stochastic geometry of the coexistence community, each node can more quickly determine the connection probabilities that are used by the locally optimizing algorithm. With random graphs, the connection probabilities are assumed to be based on independent random variables. However, in wireless networks, the probabilities are often correlated to each other through the spatial geometry of the nodes. For example, increasing transmission power can mitigate the interference experienced on a random graph edge from a node to its nearest neighbor; however this can also have the unintended consequence of raising the level of interference experienced by another neighbor to the node that was previously not connected. As a result, the algorithm may oscillate between optimal solutions for each of its neighbor connections in turn, without considering the correlation effect on the other connections. Consequently, in at least one embodiment of the present invention, meta-stable optimization results of a random graph topology are further augmented with the geographic information that the optimizing algorithm needs to converge to a stable result.

In one implementation, the nodes in the coexistence community learn of their stochastic geometry by communicating their geographic location to each other during the designated time intervals. Since the stochastic geometry of the community is dynamically changing, the location information may be communicated regularly. Based on the collected location information, each node may perform a triangulation operation (e.g., using the known Delaunay triangulation method, such as that described in U.S. Pat. No. 5,774,876 to Woolley, et al. issued Jun. 30, 1998 entitled "Managing assets with active electronic tags", incorporated herein by reference in its entirety) to determine its nearest neighbors. The distribution of nearest neighbors may then be used to estimate the distribution of interference experienced by all neighbors when the node transmits at various power levels. Advantageously, by taking into account the stochastic geometry, only the minimum power needed to communicate to the closest neighbor is required during initialization, reducing power consumption and accelerating the speed of convergence to the optimal solution.

In alternate embodiments, location information is not directly communicated. In one such embodiment, each node may initially transmit at maximum power in order for interference measurements to be taken by all potential neighbors. Each neighbor communicates the result back to the interfering node. This embodiment of "percolating" the control messages through the network may be significantly more complicated, as the coexistence community will experience the maximum level of interference during the initialization phase.

Percolation Theory—

Finally, percolation theory provides criteria for determining the critical point behavior of connected clusters of nodes within a random graph. It allows each node to determine, based on its local measurements of inbound connection probabilities, whether it should attempt to propagate its sensitivity profile and inbound connection probabilities throughout the coexistence community. In particular, percolation theory thresholds can be monitored by each of the devices to characterize when the coexistence community has a high connectivity (called the super-critical case), or a low connectivity (called the sub-critical case). Each device measures the probability of communicating with its nearest neighbors. When each of the devices has exceeded a threshold of connectivity, the entire coexistence community is super-critical and can freely disperse interference information. When one or more of the devices is below the threshold of connectivity, the coexistence community is sub-critical; thus, during sub-critical operation, each device of the coexistence community may transmit limited performance profiles, or may not transmit performance profiles at all.

Consider a gradation of mesh topologies: at one extreme, the topology is a disconnected collection of nodes, and at the other extreme, a fully connected mesh. A message must traverse from one node to any other node with any number of hops. Quite reasonably, a network of sparsely connected nodes has a low probability of guaranteeing the delivery of the message. In contrast, a fully meshed network is overkill. Percolation theory provides methods for identification of tipping points in relation to scarcity/abundance. Such methods show that the population of interconnections between nodes transitions from scarcity to abundance within a relatively small range.

Thus in one exemplary embodiment, each device of the coexistence community locally monitors a threshold at which the connectivity of the random mapping transitions from sub-critical to super-critical. Generalized percolation theory modeling teaches that the coexistence community is fully connected when the connection probabilities for a nearest neighbor is higher than a threshold (e.g., 71% for a square lattice $Z^2$). The minimum probability of success threshold can be generalized for any arbitrary topology. In one exemplary embodiment, the probability of success threshold is set at a default value, such as 71% connectivity. Thus, each node begins its initialization by transmitting a probe signal for the purpose of determining whether the probability of success threshold can be achieved. The probe signal is initially transmitted at the lowest power level setting of the node. This power level is increased until the node receives an acknowledgement from its neighbor that the probe signal was received across the connection. Once received, several more probe signals are transmitted until the probability of successfully sending the probe signal can be determined. Once determined, the algorithm compares this result against the minimum probability of success threshold (e.g., 71%). If the threshold is exceeded, the node proceeds to transmit its sensitivity profile and inbound connection probabilities. If the threshold is not exceeded, the node will increase its transmission power further. Finally, if the threshold is not exceeded even after transmitting at the maximum power level, the node will stop transmitting so as to not cause unnecessary interference in the coexistence community. The initialization sequence is only restarted after receiving a probe signal from another node.

Exemplary Sensitivity Profile—

In one aspect of the present invention, a performance profile is a set of sensitivities to various performance metrics useful in conjunction with the aforementioned optimization algorithms. These sensitivities are with respect to the local objective of the wireless device, and take the form of a curve. This curve can be represented by a constant value, or an array of parameters used to represent any arbitrary sensitivity curve shape. Referring now to FIG. 7, one embodiment of a messaging format 700 useful in implementing the principles of the present invention is shown and described in detail. The table illustrates a sequence of TLV (type-length-value) comprising three elements: detected environmental conditions 702, device information 704, and optional sensitivity profile 706.

As shown in the exemplary embodiment, the detected environmental conditions 702 may comprise information such as: the number of interferers, the types of interferers, PHY and MAC information corresponding to the interferers (e.g. such as the RSSI, MAC address, etc.), such as the location of each neighbor device, and their interference levels.

The device information 704 may comprise information such as: geographical information, device protocol information, device physical capabilities information (such as Equivalent Isotropic Radiated Power (EIRP)).

The sensitivity profiles 706 provide a plurality of fields to support optional sensitivities to one or more performance parameters. In the illustrated embodiment, several parameters are shown: channel occupancy, bandwidth allocation, power consumption, latency, jitter, and throughput. As aforementioned, each device is given an incentive to provide sensitivity parameters to improve its own performance within the community. However, in certain scenarios it may be advantageous to assign default values for neighboring devices which do not provide parameters. Such default values may be assigned based on the device information of 704, e.g. generically a Bluetooth device with RSSI and EIRP values may be assigned a particular default profile. Moreover, each device is not necessarily limited to a single sensitivity profile. For example, different application categories, such as voice, video, and data each have their own sensitivities to interference, and that sensitivity can vary with the underlying network, even for the same device. Thus, the narrowest sensitivity profile is tied to the combination of: (i) an application category (such as voice), (ii) the underlying network used (such as Bluetooth) to communicate information on behalf of the application, and (iii) each device in the community.

In complex implementations, the profiles may be hierarchically organized. For example, a profile may have a root profile, which broadly encompasses the sum of all of the application categories on a variety of networks. One set of branches limit the sensitivity profile to a combination of each device and each network that it supports. Alternate branches would further limit the sensitivity profile to a combination of each device and each application category it supports. Subsequent branches would incorporate limitations, thereby further limiting the sensitivity profile to a combination of each device, each network it supports, and each application category.

The allocation of spectrum resources between access categories and networks that results from the exchange of sensitivity profiles could be based on an alternating wireless medium access scheme, a packet traffic arbitration scheme, or a combination of the two. Historically, the key idea of adaptive packet selection and scheduling methods is to adapt transmissions according to channel conditions, such as interference from other networks. Unlike prior art solutions, the profiles are used to determine the extent to which existing channel conditions ultimately matter.

It is further appreciated by those skilled in the arts, that such parameters may directly describe the requirements of the system, such as maximum or minimum thresholds for values. For example, jitter tolerance may be signified with a value indicating the maximum allowable threshold. In another example, throughput requirements may be signified a minimum throughput level requirement. For relatively simple values, linear algebra algorithms common throughout the arts can be used to determine device interoperability behavior.

In other more sophisticated embodiments an array of values may be required to further specify the sensitivity curves (e.g. a line, an interpolated plot, a parametric equation, etc.). Ideally, the profile conveys a tradeoff between desired and undesired characteristics. For example, for a time dependent value such as latency, there may be a sensitivity value for the first microsecond of latency adjustment, another sensitivity value for the second microsecond of latency adjustment, etc. The collection of these parameters forms a sensitivity curve of latency versus time. Alternatively, channel occupancy may be bandwidth dependent; e.g. for a first bandwidth there may be a first value for weight given to channel occupancy, for a second bandwidth there may be a second value for channel occupancy. Parametric relations may be useful to describe certain multiply dependent qualities; for instance throughput may be described in both time and bandwidth.

Conversely, such parameters may indirectly describe the requirements of the system, such as by providing a plurality of coefficients for functions which describe performance impacts. In one such example, relative performance versus jitter tolerance may be identified as a "waterfall" function. In another example, channel occupancy may essentially be a simple linear relation. Analysis of such functions is complex and conceivably processor intensive, thus it will be appreciated that mathematical methodologies other than those listed herein may be employed to accelerate performance if desired.

Exemplary Localized Algorithm for Node Coexistence—

The following discussion provides high level software simulation code, and simulation results as applied to an exemplary coexistence community in accordance with one or more aspects of the present invention. The following discussion is separated into the following subsections: (i) the setup phase, (ii) the computation phase, (iii) the objective function. One exemplary implementation of the following algorithm is implemented within a MATLAB® simulation (see Appendix I included hereto).

Setup Phase—

Figure 8:
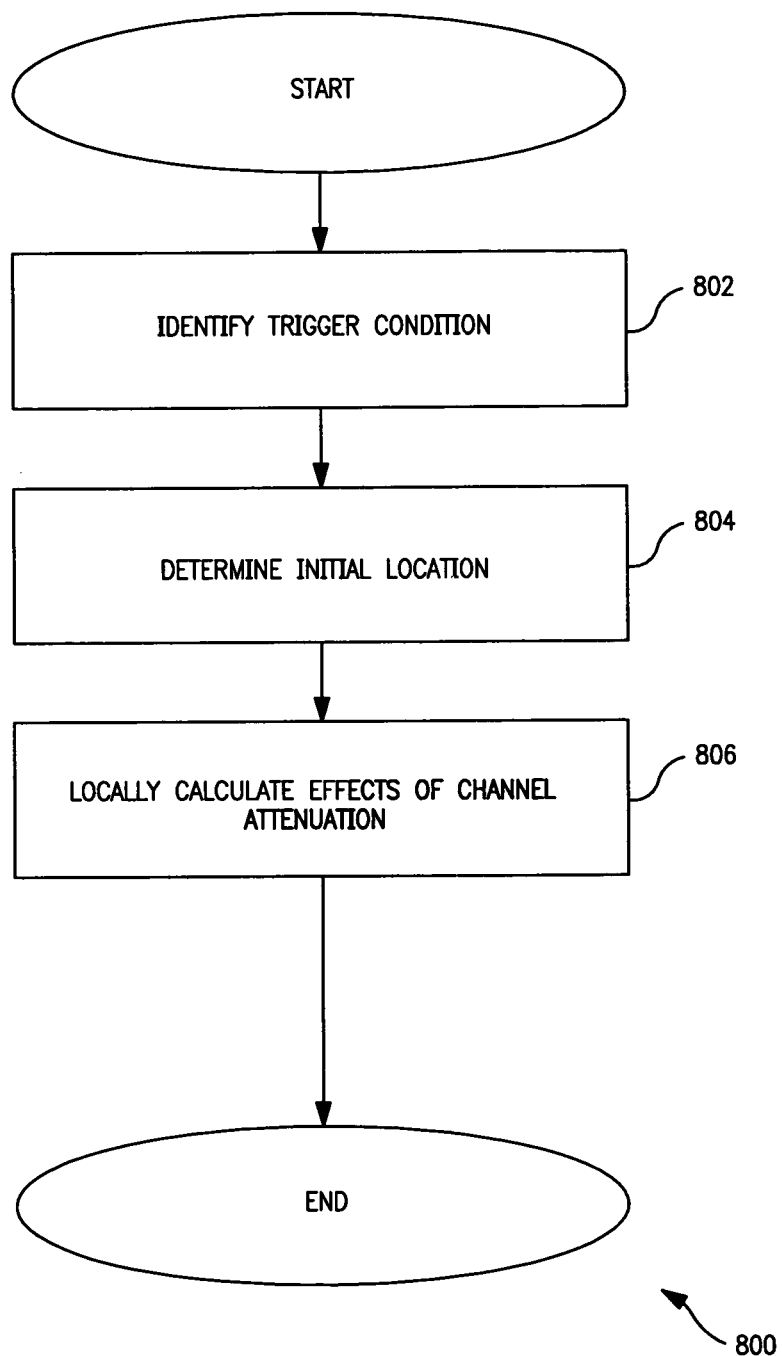
FIG. 8 is a logical flow diagram for initializing coexistence community operation, in accordance with the principles of the present invention.

Referring now to FIG. 8, one generalized method 800 for setting up global optimization is described. In one exemplary embodiment, global optimization is triggered based on super-critical and sub-critical coexistence communities, where network optimization is executed during super-critical phases, is described.

In step 802 of the generalized method 800, the local algorithm uses the results of percolation theory to determine when it is appropriate to share sensitivity profiles with the community and participate in solving for the globally optimal result. In one embodiment, each node measures its probability of success transmitting on each outbound link. When that probability exceeds a threshold on all outbound links, (for example 71%), then the node joins the coexistence community by transmitting its sensitivity profile, along with the profiles of other nodes that it has received.

This threshold is determined from the random graph topology of the coexistence community, based on the received sensitivity profiles. These profiles create a graph of the connections between the nodes. Based on this graph, the number of connection pathways through the environment is estimated using standard random graph mathematical techniques such as those described in "Stochastic Geometry and Random Graphs for the Analysis and Design of Wireless Networks" *IEEE Journal on Selected Areas in Communications*, September 2009, by M. Haenggi, J. Andrews, F. Baccelli, O. Dousse, and M. Franceschetti incorporated herein by reference in its entirety (hereinafter referred to as Haenggi et. al.).

Using the union bound, each node can estimate a lower threshold on the connection probability, below which the probability of percolating through the network is guaranteed to converge to zero (i.e., sub-critical). Similarly, each node may determine the upper threshold on the connection probability (i.e., super-critical). Above the upper threshold, the coexistence community has a positive probability of reaching every node in the coexistence community. In one exemplary embodiment, the upper threshold is computed by the local algorithm using the well known mathematical formula (see Haenggi et al.). In the simulation examples (described hereinafter), the upper threshold is nominally 71%.

At step 804, the local algorithm uses stochastic geometry techniques to identify the random spatial distribution of nodes, and the effects of shadowing, and fading. In one exemplary embodiment, each node broadcasts all of the unique sensitivity profiles it receives. Included in these profiles are the location coordinates for the node. Using this information, each node running the local algorithm learns about the location of nodes that may be causing interference, but whose signal is too weak for its sensitivity profile to be received directly. In another embodiment, the location information is used for the computation of shadowing and fading effects on the link. This is important, because as the nodes move stochastically through the environment, their relative geometry changes. These changes have an effect on the connection probability, with the effects of shadowing and fading being more variable with geometric movement than distance.

At step 806, each node running the local algorithm computes an adjustment based on an estimate of the signal attenuation on each link due to shadowing, fading, and distance. In one exemplary embodiment, each of these estimates is individually multiplied by an estimate of the standard deviation of the signal level due to shadowing, fading, or distance with stochastic movement of the nodes. The nodes may sum these weighted estimates to determine an estimate of the future variability in the probability of receiving or transmitting over a link connection.

In one embodiment, the stability measure for the link is used by the local algorithm to determine the amount of additional transmit power margin necessary to exceed, for example, a minimum threshold (such as 71%) (the nominal value predicted in percolation theory models) when transmitting across the link. For example, if the connection probability is exactly 71%, but the stability measure indicates a standard deviation of 5 dB in the signal level; the node may increase the power level of its transmissions on this link by 15 dB, thereby achieving a 99% probability of staying above the 71% threshold.

The Computation Phase—

Figure 9:
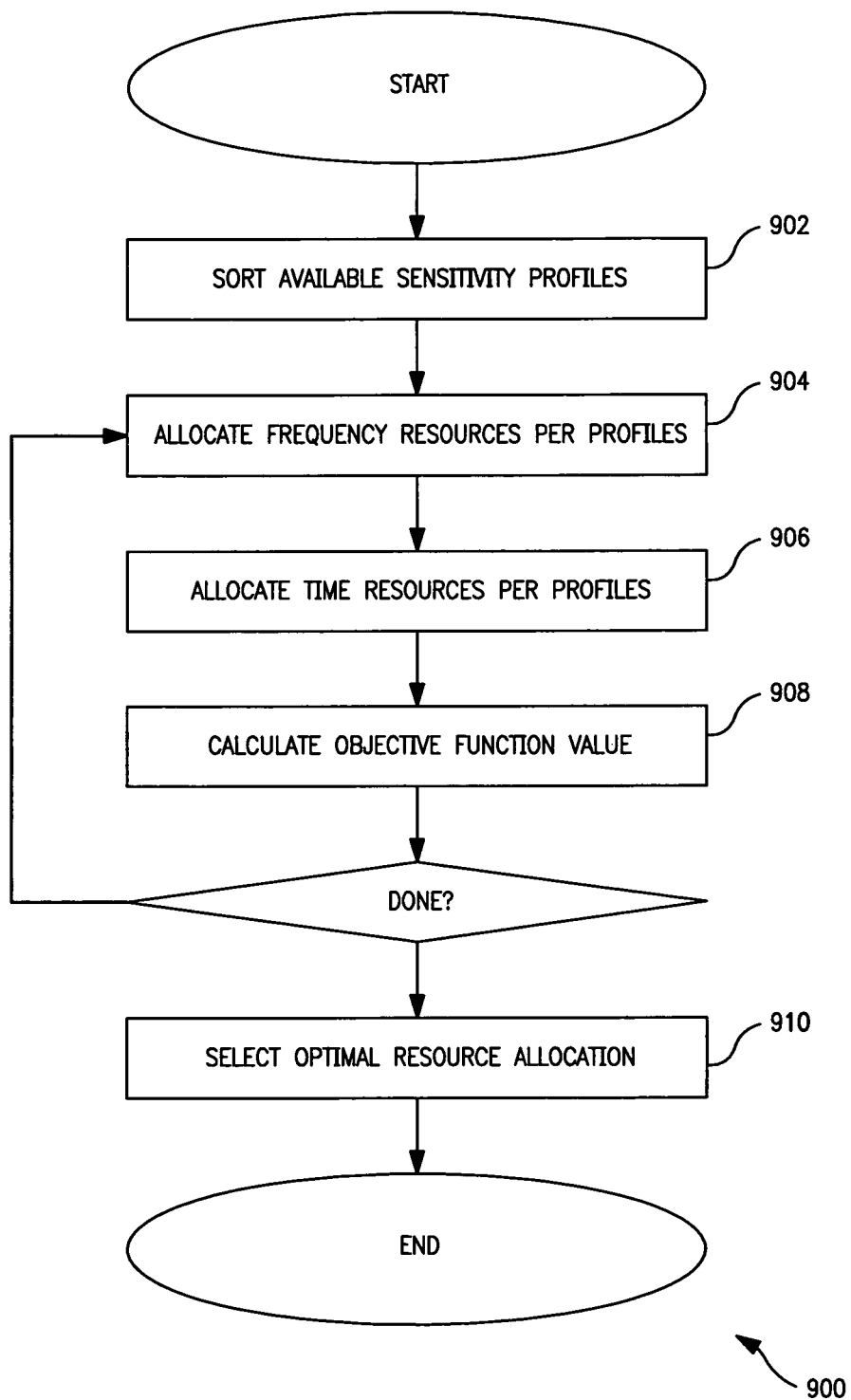
FIG. 9 is a logical flow diagram for local determination of coexistence community operation, in accordance with the principles of the present invention.

Referring now to FIG. 9, one generalized method 900 for computing appropriate behavior based on a number of sensitivity profiles is disclosed.

At step 902, in one exemplary embodiment, all of the received sensitivity profiles are combined and sorted according to the sensitivities of the nodes. In addition, the available channel frequencies are computed. If the channel is over-capacity for the bandwidth needs of all nodes in an overlapping region, then no solution can be found, and the algorithm discards all profiles, and starts over with the setup phase 800. In the following description, the exemplary sensitivities of the nodes are calculated with respect to time jitter.

At step 904, the nodes are allocated to the available frequencies according to their sorted sensitivities (e.g., jitter). Nodes with similar sensitivities will coexist on the same channel frequency.

At step 906, for each channel frequency each sorted node running the local algorithm will allocate time to the nodes assigned to that frequency in discrete blocks called transmission burst opportunities. In one exemplary embodiment, the time allocation periodically repeats at a regular interval called the combined cycle period. In one such embodiment, the combined cycle period is determined by computing the least common multiple of the average delay between transmissions requested by each of the nodes in their sensitivity profiles.

At step 908, for each channel frequency, the time allocations on the channel are computed based on the bandwidth, jitter sensitivity, and average delay values for each node as specified in its sensitivity profile. In one embodiment, an objective function derives appropriate time allocations based on, inter alia, the position of the initial burst in the sequence of bursts (or the "base start time") that will be allocated by the objective function to each node, and allowing the objective function to compute a metric that quantifies how closely the needs of each node was satisfied.

At step 910, the sequence of time allocations for all nodes corresponding to the minimum value of all objective function outputs is the optimal time allocation. In one exemplary embodiment, the minimum value of all objective function outputs is determined by minimizing the objective function outputs over all combinations of transmission sequence start times for the interfering nodes. In one variant, a multidimensional matrix (called the search domain) is constructed, where each dimension in the matrix corresponds to an interfering node. Thus, the indices of the matrix entries identify a set of time allocations, with each dimension index corresponding to a transmission burst sequence for that corresponding node. The value stored in each matrix entry is the output from the objective function when it evaluated that particular set of time allocations.

Lastly, the minimum value stored in all of the matrix entries corresponds to the locally optimal solution. In one exemplary embodiment, the optimal time allocation is computed by an exhaustive search through the multi-dimensional matrix, looking for the minimum value (detailed below). Faster methods, such as using linear and/or non-linear optimizing solvers (including without limitation linear programming techniques) can be applied to accelerate the search time if desired as well, consistent with the invention.

The Objective Function—

As previously mentioned, in one exemplary embodiment, the optimal time allocation is iteratively determined, using an exhaustive (or "brute force") search. The goal of the objective function is to get as close as possible to an ideal delay between allocated transmissions (this value comes from each profile), and an ideal length of each transmission burst (computed as the ratio of the ideal average delay divided by the average channel occupancy as specified in each profile). Each node determines its channel occupancy needs by determining its application data rate requirement (including overhead, control and application data), and dividing by its modulation and coding (MCS) transmission rate.

Each node running the objective function is given a starting point (called the base start time) for allocating the sequences of transmission burst opportunities for each node assigned to the channel, along with the sensitivity profiles of all nodes assigned to the channel, and the length of the combined cycle period for the channel. Each node uses these inputs to allocate sequences of time within the combined cycle period to the sorted nodes in the order of their jitter sensitivity. Starting with the most sensitive nodes, non-overlapping slots are allocated. Each additional node will increase the overall crowding of the community.

In one embodiment, the most sensitive node is allocated a sequence of time slots with the minimum jitter in the length of the bursts, and no variation in the delay between bursts during the combined cycle period. The computed delay and length jitter variances will normally be quite small across all objective function executions. The remaining nodes assigned to the channel are allocated their transmission burst sequences, in decreasing order of their jitter sensitivity. Once the sequence is determined, the delay jitter and burst length jitter of the result is calculated. The goal of the objective function is to allocate enough time in each transmission burst to satisfy the average bandwidth requirement of each node as requested in its sensitivity profile. This time allocation goal is different for each node, because it is based on the application needs of each node.

Each node is allocated its own sequence of transmission bursts within the combined cycle period. Each burst in the sequence may or may not overlap with the bursts allocated to other nodes. In some cases, a node may not be allocated enough slots to fulfill its dynamic bandwidth needs. This is handled by the objective function by allocating bonus time into neighboring time allocations. The node is able to utilize the bonus time whenever the channel is available. The node does this by using contention-based access to the channel. Thus, if an adjacent node does not transmit in its neighboring time allocation, the node can dynamically use a portion of this time in order to meet its bandwidth needs. However, because bonus time is not guaranteed, the application may experience additional jitter if it is must utilize more than one transmission burst opportunity to transmit a packet. This means that, as a general matter, all nodes should be prepared to contend for access to the channel (unless their jitter sensitivity is 100%).

Finally, the delay and length jitter variances for all nodes are combined into an outcome metric for the objective function. This outcome metric quantifies the suitability of the time allocation to the needs of the nodes assigned to that channel. For each node, the objective function calculates the difference between the actual and ideal average delay between transmission bursts over the cycle period, as well as the difference between the actual and ideal length between transmission bursts over the cycle period. From this result, the objective function computes the variance of the delay differences over the cycle period, and adds the variance of the length differences, with the result multiplied by the jitter sensitivity.

Figure 10:
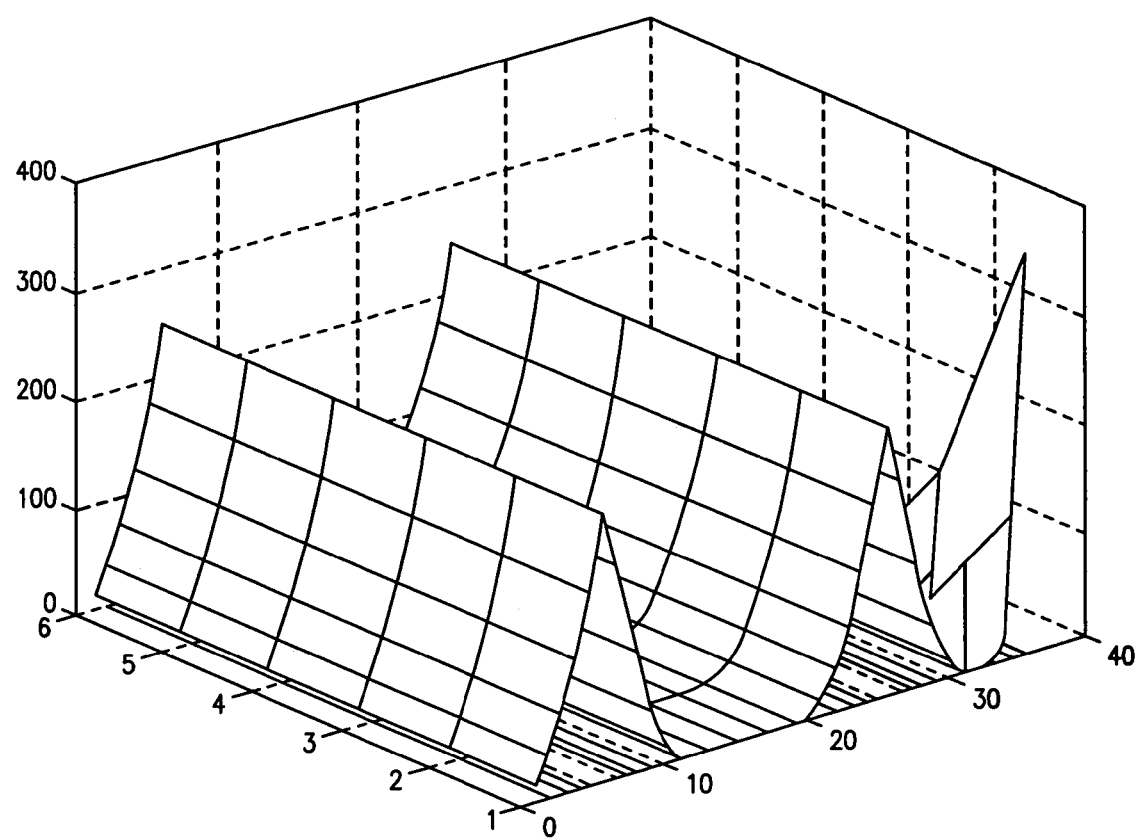
FIG. 10 is a graph of a MATLAB® simulation illustrating the results of one exemplary coexistence scenario according to the invention.

FIG. 10 is a graphical representation of simulation results of an exemplary computerized simulation (rendered in MAT-LAB®); see Appendix I hereto.

Example Operation—

Referring back to FIG. 1, one exemplary system architecture 100 is shown having three distinct wireless systems denoted A, B, and C. In this example, each system comprises two transceiving devices variously engaged in transmitting, receiving, and simultaneous transmitting and receiving. System A is an IEEE 802.11 system, System B is a Bluetooth system, and System C is a cordless phone system. The performance metrics to be monitored by each device executing the global optimization algorithm are throughput, latency, and average power consumption. Each device can "hear" other devices in this example; i.e. each device experiences interference from the other devices. However, it is not always the case that each device is directly aware of other devices. As shown in FIG. 1, devices belonging to a first system may be out of range of devices belonging to a second system, yet the transmissions (from the first system) can still affect the performance of the devices of the second system. In IEEE 802.11, this is generally referred to as a "hidden node". Within each of the given wireless network standards of FIG. 1, there already exist well known internal algorithms for optimizing the allocation of transmit resources for power, latency, bandwidth, QoS, etc., all of which are inadequate for reasons previously discussed. Thus, the complexity of system interactions within this example provides an ideal scenario for optimizing the allocation of transmit resources using one or more aspects of the present invention.

Accordingly, during system operation, each of the enabled systems identifies and establishes a cooperative dialog in accord with the methods of the invention. The cooperative dialog enables the transmission of aforementioned performance profiles. The profiles that are transmitted by each device to each other device contain at least device location, wireless protocol standard, and sensitivity curves for throughput, latency, and power consumption. For simple systems, or those having relatively sedentary natures, the cooperative dialog may be performed relatively infrequently. In more complex systems, regular communication of the profile messages is required. Thus, location information included with the profile information, combined with the changing signal strengths, can drastically change the outcome of the optimization algorithm.

In this simple example, the devices are considered sedentary. Referring now to relevant portions of performance profiles, FIG. 7A, FIG. 7B, and FIG. 7C illustrate exemplary sensitivity curve parameters (i.e. 706A, 706B, 706C) representative of the dynamic performance requirements of System A (IEEE 802.11 streaming video), System B (Bluetooth file transfer), and System C (cordless phone engaging in a voice call). For simplicity, the sensitivity curves are described by a single parameter value. Higher sensitivity numbers give proportionately more weight to changes in the corresponding metric. Lower valued parameters are given less weight.

After the profiles have been exchanged, each node stores all three profiles locally. Each node then executes the global optimization algorithm locally. As each node processes the same algorithm with the same performance profile inputs, all nodes obtain the same solution in parallel, and modify their corresponding behavior accordingly. The algorithm is deterministic, and shared among each of the participants.

In this example, the algorithm solution gives the lowest latency to System C by giving that System relatively more transmission opportunities, as this reduces the amount of time a phone call packet sits in a transmit buffer awaiting transmission. The highest throughput is given to System A by giving it relatively more channel occupancy, which increases its throughput capacity. System B is given relatively more channel occupancy than the other systems. Given that this system is also getting relatively less throughput, the low throughput and higher channel occupancy allows System B to use a relatively lower modulation rate, which translates into a more reliable transmission. This is necessary for file transfers because file transfers need to be error-free, whereas video and phone call applications can endure a certain level of errors and thus can tolerate a relatively less reliable transmission.

The localized algorithms each determine appropriate amounts of resources, while considering the relative needs of its neighbors. For example, while System C gets lower latency via more transmission opportunities, the duration of these opportunities is much shorter, leading to reduced overall channel occupancy, and throughput. The reduced overall channel occupancy and throughput are occupied by System B and System A. Thus while each system loses some degree of flexibility, no system is ignored or neglected.

Methods of Doing Business—

In another aspect of the invention, methods of doing business relating to the aforementioned apparatus and operational/optimization methods are disclosed.

In one aspect, such business methods may comprise the "parameterization" or objective measurement of one or more monetary values for each community device (i.e., Device, A, B, C in FIG. 1), or the community as a whole. In various exemplary embodiments, the devices within a wireless coexistence community may have varying levels of profitability.

In one example business model, a coffee shop may support multiple wireless systems (e.g., WiMAX, PAN (802.15), etc.) having various data rates, and degrees of interference. During high-traffic business hours, the coffee shop may opt to support a relatively high data rate service only for customers willing to pay for such service. During low traffic hours, the coffee shop may opt to utilize its resources to broadcast advertisements, and/or provide services freely to draw more customers into the shop.

In another example, a network operator may decide to preferentially subsidize new or improved infrastructure investments by providing a monetary value for each supported service. The operator may then preferentially devote more resources to the newer technology within coexistence communities to entice new subscribers, and yet continue to offer equivalent services in legacy neighborhoods/regions.

In another aspect, such business methods may indirectly value one or more network objectives from a business perspective. In such embodiments, devices having coexistence cooperation capabilities are inherently more valuable. For example, network operators may preferentially subsidize or give monetary or other preferences to clients able to coexist peacefully with other legacy devices. Such cooperative devices have inherent value for the network operator as they minimize the management burdens caused by the introduction of newer technologies.

In another example, the aforementioned coffee shop may opt to support multiple wireless systems, having no preference to systems within the wireless community, but may be limited in its overall ability to support data (e.g., limitations on bandwidth based on their plan purchased from their ISP). In one such example, the coffee shop may determine that lower-rate, high-reliability data services are preferred among its customer base during high business hours. Furthermore, the coffee shop may choose to support high data rate services in off-peak hours. Therefore, the coffee shop may prefer to invest in service devices (e.g. femtocells) which are able to adjustably "throttle" up and down their performance profiles.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I - Exemplary Computerized (MATLAB®) Simulation
© Copypright 2008-2009 Apple Inc. All rights reserved The Local algorithm builds an array of all the sensitivity profiles received:

```
function LocalAlgorithm(nodeAsens, nodeBsens, nodeCsens)
Sensitivities = [nodeAsens; nodeBsens; nodeCsens ];

% Next, we see if the bandwidth needs of all nodes can be satisfied
% For now, assume all nodes interfere with each other
% TBD: use random graph to determine which nodes share the channel % We load to an 90% limit so there is always headroom to distribute
% sensitivity profiles and channel probabilities, and to handle the temporary
% exceess bandwidth requirements of jitter insensitive applications % list of 7 available frequencies
frequencyList = 2400:20:2520;

tempSens = cell2mat(Sensitivities);
if sum(tempSens(:,3)) >= .9*size(frequencyList)
    error('not enough channel resources to satisfy the bandwidth demands of all app.
end;

% Rank the jitter sensitivities
% NOTE: a lower jitter sensitivity implies a greater variability
% in the size of the transmission opportunities
% because it not only indicates your node's sensitivity to losing a
% transmission opportunity, but also implies how often your node will need
% extended time during its transmission opportunity
jitterRanking = -sortrows(-tempSens, 2);

% preallocating these arrays for speed
CombinedCycleLength=zeros(length(frequencyList),1);
jitterFreqList=cell(length(frequencyList),1);

% allocate interfering nodes to available frequencies in order of
% their jitter sensitivities
for freqNum=1:length(frequencyList)
    jitterIndices = find(cumsum(jitterRanking(:,3)) < .9);
    jitterFreqList{freqNum} = jitterRanking(jitterIndices,:);

% generate minimum combined cycle for each frequency
    CombinedCycleLength(freqNum) = 1;
    for nodeNum=1:size(jitterIndices)
        CombinedCycleLength(freqNum) = lcm(CombinedCycleLength(freqNum), ...
            jitterFreqList{freqNum}(nodeNum,4));
    end
    jitterRanking = jitterRanking(size(jitterIndices)+1:end,:);
end % loop for each frequency that is available
for freqNum=1:length(frequencyList)
    % for this frequency, loop through all of the possible base start times
    nodeCount = size(jitterFreqList{freqNum},1);
    if nodeCount <= 1, continue, end % remember to add an extra entry at the end for the available slots
    baseSpacing = ones(nodeCount,1); % initial spacing values
    baseTimes = [CombinedCycleLength(freqNum); triu(ones(nodeCount))*baseSpacing];
    nodeNum = 1;
```

```
    % TBD:  We will need to build the multi-dimensions using strings
    % and then evaluate it
    outcomes=10^10*ones(baseTimes(1), baseTimes(1), baseTimes(1));

while nodeNum < nodeCount
        while baseTimes(2) < baseTimes(1)
            temp1 = mat2str(baseTimes(2:end));
            temp1 = strrep(temp1,';',',');
            temp1 = temp1(2:end-1);
            temp2 = ['outcomes(',temp1,') = ' ...
                'ObjectiveFcn(baseTimes, CombinedCycleLength(freqNum), jitterFreqLis
            eval(temp2);
%            ObjectiveFcn(baseTimes, CombinedCycleLength(freqNum), jitterFreqList{fr
            baseTimes(2) = baseTimes(2) + 1;
        end % we get here only because there is a carry, let's see how far it goes
        nodeNum = 1;
        while baseTimes(2) >= baseTimes(1)
            nodeNum = nodeNum + 1;
            if nodeNum >= nodeCount, break, end;
            baseSpacing(nodeNum) = baseSpacing(nodeNum)+1;
            baseSpacing(1:nodeNum-1) = 1;
            baseTimes = [CombinedCycleLength(freqNum); triu(ones(nodeCount))*baseSpa
        end baseSpacing(1:nodeNum-1) = 1;
    end
surfc(outcomes(45:50,5:40,1));
end %
% % By ordering the allocation of channel resources according to jitter,
% % we can grant bonus time into adjacent allocations on both sides.
% % the amount of bonus time is based on the value of the jitter sensitivity
% % If not sensitive at all to jitter, the node is given a bonus transmission
% % opportunity that starts coincident with the previous node's base transmission
% % start time, and extends until the next node's base transmission
% % end time.
%
% txBonusTimes=cell(size(frequencyList,2),1);
%
% for freqNum=1:size(frequencyList,2)
%
%     if size(jitterFreqList{freqNum},1)~=0
%
%         txBonusTimes{freqNum} = [ -(1-jitterFreqList{freqNum}(1,2))*txBaseTimes{fr
%             (1-jitterFreqList{freqNum}(1,2))*txBaseTimes{freqNum}(2,4)];
%
%         for nodeNum=2:size(jitterFreqList{freqNum},1)
%             % allocate the bonus times.  For each row, the first column is the num
%             % of time units the node can begin contention in advance of its base s
%             % time.  The second column is the number of time units the node can
%             % continue transmission after the end of its base end time
%
%             txBonusTimes{freqNum}(nodeNum,:) = [ -(1-jitterFreqList{freqNum}(nodeN
```

```
%                   (1-jitterFreqList{freqNum}(nodeNum,2))*txBaseTimes{freqNum}(nodeNu
%           end
%       end
% end
%
% names=[names; {length(names)+1, 'Available'}];
%
% for index=1:size(frequencyList,2)
%     if ~isempty(txBaseTimes{index})
%         display ('the base allocated times');
%         display(txBaseTimes{index});
%
%         figure(2*index-1)
%         temp1=[txBaseTimes{index}(:,4)';zeros(1,length(txBaseTimes{index}(:,3)))];
%         barh(temp1,'stacked');
%         temp= ['Frequency ' num2str(index) ' base time allocation'];
%         title(temp);
%         colormap summer;
%         legend(names{txBaseTimes{index}(:,1),2});
%
%         display ('the bonus allocated times');
%         display(txBonusTimes{index});
%
%         figure(2*index)
%         temp1=txBonusTimes{index};
%         barh(temp1);
%         temp= ['Frequency ' num2str(index) ' bonus time allocation'];
%         title(temp);
%         colormap summer;
% %         legend({'Start time adj', 'End time adj'});
%     end
% end
%
% display(txBonusTimes{1});
```

What is claimed is:

1. A method for optimizing one or more operations of at least one of a plurality of wireless devices operating within an environment where interference and competition for resources occurs, the method comprising:
   at a first wireless device of the plurality of wireless devices:
   transmitting first profile data to a second wireless device of the plurality of wireless devices;
   receiving second profile data from the second wireless device; and
   utilizing the first profile data and the second profile data to perform a linear programming optimization that optimizes one or more operations of the first wireless device or one or more operations of the second wireless device, according to one or more linear objective functions,
   wherein the first profile data comprises application sensitivity information associated with one or more applications running at the first wireless device or the second profile data comprises application sensitivity information associated with one or more applications running at the second wireless device;
   wherein the linear programming optimization comprises utilization of a fairness equation to ensure that both the first wireless device and the second wireless device are provided with adequate electromagnetic spectrum resources for communicating application data without jitter.

2. The method of claim 1, wherein:
   the first wireless device comprises a plurality of air interfaces associated with different communication protocols; and
   the second wireless device comprises at least one air interface in common with at least one of the plurality of air interfaces of the first wireless device.

3. The method of claim 2, wherein transmitting the first profile data comprises transmitting data using a communication protocol that is agnostic to at least one of the plurality of air interfaces of the first wireless device.

4. The method of claim 1, wherein:
   the interference comprises an interference between at least the first wireless device and the second wireless device; and
   the competition for resources comprises a contention for a common portion of electromagnetic spectrum resources between at least the first wireless device and the second wireless device.

5. The method of claim 1, wherein the first profile data or the second profile data further comprises:
   (i) data indicating one or more communication capabilities of the first wireless device or the second wireless device;
   (ii) one or more optimization factors or priorities for the first wireless device or the second wireless device; and
   (iii) data indicating one or more detected environmental factors that cause radio interference for the first wireless device or the second wireless device.

6. The method of claim 1, wherein the application sensitivity information is utilized in the linear programming optimization to optimize one or more application operations of the first wireless device or one or more application operations of the second wireless device.

7. The method of claim 1, wherein the application sensitivity information is dynamic information that changes according to variable data communication requirements of one or more applications running at the first wireless device or one or more applications running at the second wireless device.

8. The method of claim 1, wherein the first profile data or the second profile data further comprises network information associated with an underlying network utilized to communicate application data associated with one or more applications running at the first wireless device or application data associated with one or more applications running at the second wireless device.

9. A method of allocating resources between or amongst a plurality of wireless devices operating in proximity to one another, the method comprising:
   at a first wireless device of the plurality of wireless devices:
   transmitting first profile data to a second wireless device of the plurality of wireless devices using a common air interface;
   receiving second profile data from the second wireless device; and
   utilizing the first profile data and the second profile data to optimize one or more operations of the first wireless device or one or more operations of the second wireless device, in accordance with at least one operational goal or objective,
   wherein the first profile data comprises application sensitivity information associated with one or more applications running at the first wireless device or the second profile data comprises application sensitivity information associated with one or more applications running at the second wireless device, and
   wherein optimization of one or more operations of the first wireless device or one or more operations of the second wireless device ensures that both the first wireless device and the second wireless device are provided with adequate electromagnetic spectrum resources for communicating application data without jitter.

10. The method of claim 9, wherein the optimization of one or more operations of first wireless device or one or more operations of the second wireless device comprises adjusting at least one operational parameter associated with an air interface of the first wireless device or the second wireless device that is different from the common air interface.

11. The method of claim 9, wherein transmitting the first profile data comprises transmitting data using an interface-agnostic communication protocol.

12. The method of claim 11, wherein the interface-agnostic communication protocol comprises a lightweight protocol adapted to communicate only low bandwidth data.

13. The method of claim 9, wherein utilizing the first profile data and the second profile data to optimize one or more operations of the first wireless device or one or more operations of the second wireless device is performed iteratively or periodically.

14. The method of claim 9, wherein the optimization of one or more operations of the first wireless device or one or more operations of the second wireless device is performed in response to an initiation of an application at the first wireless device or an initiation of an application at the second wireless device.

15. The method of claim 9, wherein the application sensitivity information is utilized to optimize one or more application operations of the first wireless device or one or more application operations of the second wireless device.

16. The method of claim 9, wherein the first profile data or the second profile data further comprises network information associated with an underlying network utilized to communicate application data associated with one or more applications running at the first wireless device or application data associated with one or more applications running at the second wireless device.

17. The method of claim 9, wherein the application sensitivity information is dynamic information that changes according to variable data communication requirements of one or more applications running at the first wireless device or one or more applications running at the second wireless device.

* * * * *